United States Patent [19]

Takami

[11] Patent Number: 5,361,120
[45] Date of Patent: Nov. 1, 1994

[54] STROBE CONTROL APPARATUS OF CAMERA

[75] Inventor: Satoshi Takami, Tokyo, Japan

[73] Assignee: Asahi Kogaku Kogyo Kabushiki Kaisha, Tokyo, Japan

[21] Appl. No.: 982,009

[22] Filed: Nov. 24, 1992

Related U.S. Application Data

[63] Continuation of Ser. No. 593,970, Oct. 9, 1990, abandoned.

[30] Foreign Application Priority Data

| Oct. 6, 1989 | [JP] | Japan | 1-261809 |
| Oct. 11, 1989 | [JP] | Japan | 1-264534 |
| Oct. 16, 1989 | [JP] | Japan | 1-268671 |
| Oct. 16, 1989 | [JP] | Japan | 1-268672 |

[51] Int. Cl.$^5$ ............ G03B 7/00; G03B 15/03
[52] U.S. Cl. ............ 354/419; 354/420; 354/127.1; 354/149.11
[58] Field of Search ............ 354/413, 419, 126, 127.1, 354/420, 149.11, 288, 132, 149.1

[56] References Cited

U.S. PATENT DOCUMENTS

| Re. 29,599 | 3/1978 | Ogawa | 354/149.1 |
| 3,890,538 | 6/1975 | Iwata et al. | 354/145.1 |
| 3,900,857 | 8/1975 | Tsujimoto | |
| 4,122,467 | 10/1978 | Tsunekana et al. | 354/419 |
| 4,472,042 | 9/1984 | Iwata et al. | 354/418 |
| 4,545,667 | 10/1985 | Niwa et al. | 354/419 |
| 4,847,647 | 7/1989 | Ueda | 354/149.1 |
| 4,868,592 | 8/1989 | Suzuki et al. | 354/402 |
| 4,878,081 | 10/1989 | Kishida et al. | 354/419 |
| 4,893,140 | 1/1990 | Yamamoto et al. | 354/149.11 |
| 4,908,649 | 3/1990 | Matsui et al. | 354/403 |
| 4,910,542 | 3/1990 | Yamamoto et al. | 354/149.11 |
| 4,920,368 | 4/1990 | Arai et al. | 354/149.1 |

FOREIGN PATENT DOCUMENTS

| 0275089 | 7/1988 | European Pat. Off. |
| 3219242 | 1/1983 | Germany |
| 3639751 | 5/1987 | Germany |
| 3844143 | 7/1989 | Germany |
| 54-47637 | 4/1979 | Japan |
| 56-87028 | 7/1981 | Japan |
| 63-148928 | 9/1988 | Japan |
| 2060913 | 5/1981 | United Kingdom |
| 2078985 | 1/1982 | United Kingdom |
| 2128762 | 5/1984 | United Kingdom |

OTHER PUBLICATIONS

Patent Abstracts of Japan, vol. 5, No. 154 (P-82), and vol. 3, No. 70 (E-117).
Camera Test Article on the Canon EOS 750 camera in *Shashin Kogyo*, Dec. 1988.

*Primary Examiner*—Michael L. Gellner
*Assistant Examiner*—Cassandra Spyrou
*Attorney, Agent, or Firm*—Sandler, Greenblum & Bernstein

[57] ABSTRACT

A strobe control apparatus is disclosed for a strobe camera having a light emitter that is movable between a retracted position and an operative position. The strobe control apparatus includes a shutter button having a first position which turns a photometering switch ON and a second position which turns a release switch ON. The light emitter may be controlled in accordance with an automatic light emitting mode or a compulsive light emitting mode. In the automatic light emitting mode, the light emitter is moved to an operative position and emits light when the brightness of an object to be photographed is below a predetermined value. In the compulsive light emitting mode, the light emitter emits light regardless of the brightness of the object to be photographed.

14 Claims, 23 Drawing Sheets

STROBE CONTROL APPARATUS OF CAMERA

This application is a continuation of application No. 07/793,970, filed Oct. 9, 1990, now abandoned.

BACKGROUND OF THE INVENTION

1. Field of the Invention

The present invention relates to a strobe control apparatus of a camera having a strobe incorporated therein, and more precisely it relates to a control apparatus for preventing a malfunction in a camera including a strobe which has a light emitter that is movable between a retracted position and an operative position (i.e., emitting position).

2. Description of the Related Art

Cameras having automatic light modulation type strobes have become available. A strobe incorporated camera which has is a strobe control apparatus also known, in which a light emitter of the strobe is supported by a supporting mechanism, such as a retractable mechanism or a pop-up mechanism so as to move between a retracted position in which the light emitter is retracted in the camera body and an operative position, i.e., a light emitting position in which the light emitter projects outward from the camera body by an electrical driver (e.g., an electrically driven motor).

In such a known strobe control apparatus, the control of the strobe light emission is usually effected in accordance with exposure factors, such as brightness data of an object to be taken, or calculated shutter speed data. Namely, when the object brightness is below a predetermined value upon photographing, the light emitter is brought to the operative position to emit strobe light. After the strobe light is emitted, the light emitter is returned to the retracted position. Conversely, if the object brightness is above a predetermined value, the light emitter is kept in the retracted position, since no strobe light is necessary.

However, in a conventional camera having a strobe control apparatus as mentioned above, there is a possibility that, for some reason the light emitter can not move to the operative position. For instance, the light emitter can not move, if the light emitter is held by a photographer's hand, or, if a detachable external strobe of a certain shape is attached to the camera so that the detachable external strobe interferes with the light emitter, etc. It goes without saying that no clear picture can be taken if strobe light is emitted from the light emitter which can not move to the operative position.

However, conventional cameras have not focused on the solution to the problems mentioned above. Therefore, for example, if the light emitter which is not in the operative position emits strobe light, an under-exposure occurs or no uniform brightness distribution can be obtained. Conversely, if the release is prohibited when the light emitter is not moved to the operative position, a photographer may miss an opportune picture.

Furthermore, it is also known to provide a compulsive light emitting switch which is actuated to change the photographing mode to a compulsive light emitting mode in which strobe light can be compulsively emitted regardless of the brightness of an object to be photographed. However, the provision of such an additional compulsive light emitting switch makes a camera more complicated.

Furthermore, there is known a strobe-incorporated AF camera having an auxiliary light emitter which emits a contrast pattern when the object brightness is below a predetermined value, or a camera having a self-timer photographing function. In the known cameras, the auxiliary light emitter is provided in the main strobe light emitter or in the camera body, and a self timer indicator for indicating the self timer operation is provided in the camera body.

However, the location of the self timer indicator in the camera body is restricted, especially if the camera body is housed in a body case. Furthermore, there is a possibility that the photographic lens may interfere with the self timer indicator, so that it may be difficult for a photographer to observe the indicator, depending on the position of an object to be taken, even in a photographic range in which a picture of the object can be taken.

In a strobe-incorporated camera, the strobe light emitter can be observed at any place within an area which can be illuminated with the strobe light when the strobe light is emitted. Accordingly, in theory, it is possible to provide the self timer indicator in the strobe light emitter.

However, in this possibility, the self timer indicator can not be observed from the side of the object, when the strobe light emitter is in the retracted position (i.e., inoperative position) in which it is retracted in the camera body.

Therefore, to make it possible to observe the self timer indicator, the strobe light emitter must be moved to the operative position in which the light emitter projects outward from the camera body even in the self timer mode in which no strobe light is required. This is, however not practicable, particularly with a camera in which the light emitter is manually disengaged from a locking member to move it to the operative position, since, if a photographer fails to disengage the light emitter, no indication of the self timer indicator can be observed, so that no release timing can be learned.

SUMMARY OF THE INVENTION

The primary object of the present invention is to eliminate the above mentioned drawbacks of the conventional strobe-incorporated camera having a strobe light emitter that is movable between a retracted position (i.e., inoperative position) and an operative position (i.e., light emitting position), by providing a strobe-incorporated camera which can be easily handled, effectively fulfilling the strobe function, and can reduce the possibility of failure or miss in photographing.

To achieve the object mentioned above, according to the present invention, there is provided a strobe control apparatus in a strobe-incorporated camera, comprising a light emitter which is supported in a camera body by a supporting mechanism to that moves between a retracted position and an operative position, a drive mechanism for moving the light emitter between the retracted position and the operative position, a light emitter control means for driving the drive mechanism to move the light emitter to the operative position, and an emission control means for controlling the strobe to emit strobe light at least when the light emitter is in the operative position.

With this arrangement, upon emitting the strobe light, if the light emitter does not move to the operative position for some reason, the incorporated strobe is prohibited from emitting the strobe light. Accordingly, a photographer neither fails to take a picture due to an abnormal strobe light emissions.

Preferably, an exposure control means is provided to set the shutter speed to be identical to the strobe synchronous speed when the emission control means causes the incorporated strobe to emit the strobe light in accordance with the exposure factor. If the light emitter is not in the operative position at the strobe light emission mode, the incorporated strobe is prohibited from emitting the strobe light by the emission control means, so that the exposure control means sets an optimum exposure factor (optimum shutter speed) when no strobe light is emitted. Thus, even if the light emitter is not moved to the operative position for some reason, a picture can be taken at an optimum exposure value.

In the case of a camera to which a detachable external strobe can be attached, the emission control means causes both the incorporated strobe and the external strobe to emit the strobe light when the external strobe is attached to the camera body. The emission control means prohibits the incorporated strobe from emitting the strobe light when the light emitter is not moved to the operative position, so that the strobe light is emitted only from the external strobe which is attached to the camera.

Thus, a picture can be taken at an optimum exposure value, even if the light emitter of the incorporated strobe is not moved to the operative position for some reason. Consequently, a photographer neither fails to take a picture due to an abnormal strobe light emission nor misses a shutter chance due to an inoperability of the shutter.

According to another aspect of the present invention, there is provided a strobe control apparatus in a strobe-incorporated camera having a light emitter of the incorporated strobe which is supported in a camera body by a supporting mechanism that moves between a retracted position and an operative position, and a drive mechanism that moves the light emitter between the retracted position and the operative position, wherein the improvement comprising a strobe control apparatus having a first switch means, a second switch means, a photometering means for calculating an exposure factor when the first switch means is turned ON, and an emission control means for moving the light emitter to the operative position when the exposure factor is below a predetermined value, so that when the second switch means is turned ON, the incorporated strobe emits the strobe light.

With this arrangement, the mode becomes the automatic light emission mode and the compulsive light emission mode, when the light emitter is in the retracted position and in the operative position, respectively. Accordingly, no operation switch for switching the light emission mode is necessary.

According to still another aspect of the present invention, there is provided a strobe control apparatus in a strobe-incorporated camera having a light emitter of the incorporated strobe which is supported in a camera body by a supporting mechanism that moves between a retracted position and an operative position and a drive mechanism that moves the light emitter between the retracted position and the operative position, the improvement comprising a strobe control apparatus having an auxiliary light emitting member provided on the light emitter to emit a contrast pattern, a self timer photographing means, and a self timer indication controlling means for driving the drive mechanism to move the light emitter to a position in which the light emitter is visible by an object to be taken so as to cause a blinking of the auxiliary light emitting member.

With this construction, since the light emitter is moved to a predetermined position at the self timer photographing mode, and since the auxiliary light emitting member blinks to indicate the self timer mode, the self timer indicating member can be observed from an object at any place which can be illuminated with the strobe light.

If the self timer indicating member and the auxiliary light emitting member are made as a single element, the number of the components can be reduced. Conversely, if the self timer indicating member is separate from the auxiliary light emitting member, a more effective self timer indication and a more effective auxiliary light emission are made possible.

According to still another aspect of the present invention, there is provided a strobe control apparatus in a strobe-incorporated camera having a light emitter of the incorporated strobe which is supported in a camera body by a supporting mechanism that moves between a retracted position and an operative position and a drive mechanism that moves the light emitter between the retracted position and the operative position, wherein the improvement comprising a strobe control apparatus having a self timer indicating member that is provided on the light emitter to be visible from the side of an object to be taken when the light emitter is in the retracted position, a self timer photographing means, and a self timer indication controlling means for driving the self timer indicating member upon the self timer photographing to indicate the self timer photographing.

In this arrangement, the self timer indication can be made by driving the self timer indicating member, while keeping the light emitter in the retracted position.

BRIEF DESCRIPTION OF THE DRAWINGS

The invention will now be described below in detail, with reference to the accompanying drawings, in which.

DESCRIPTION OF THE PREFERRED EMBODIMENTS

The following discussion will be directed to preferred embodiments of the present invention.

Figure 1:
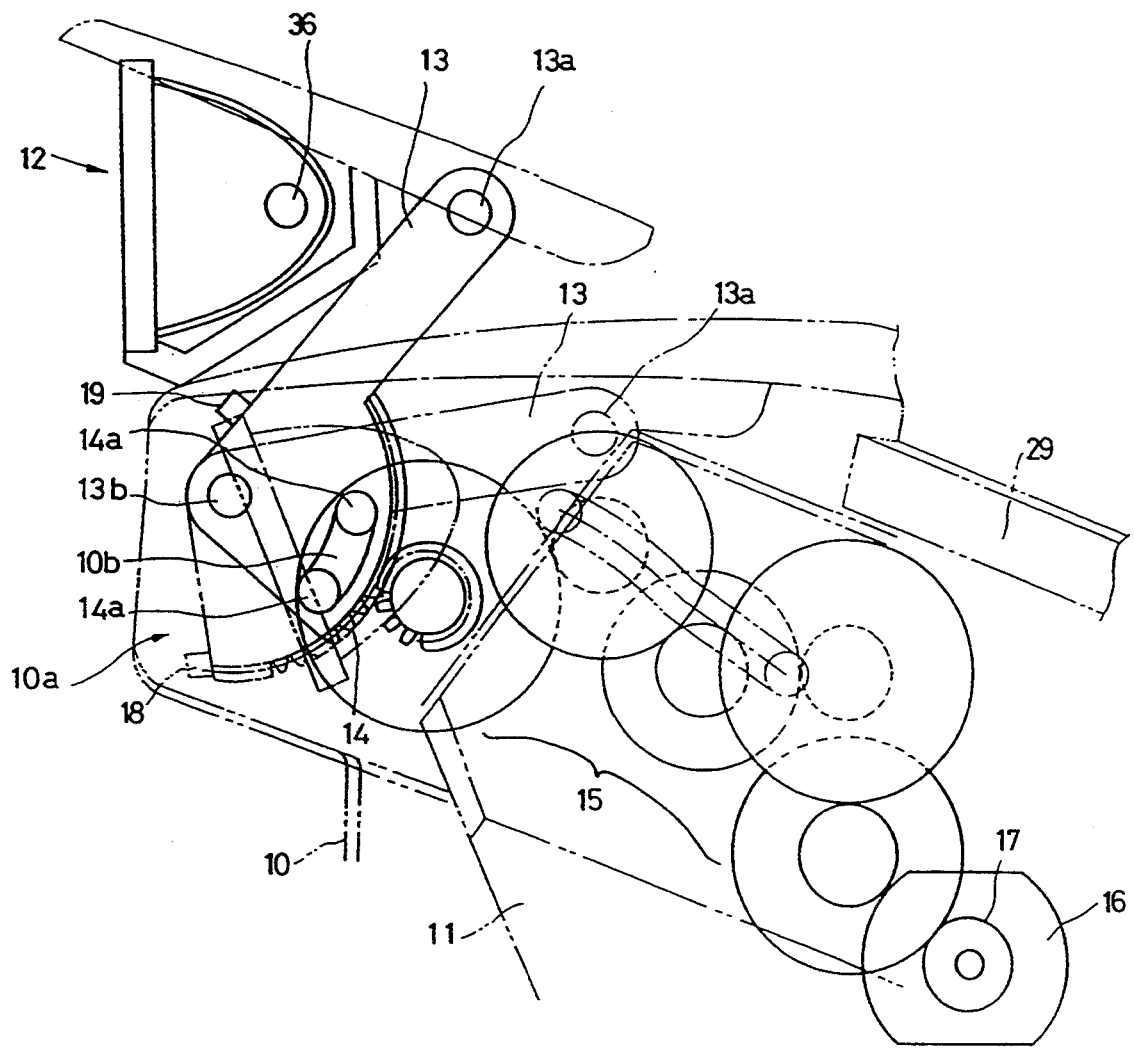
FIG. 1 represents is a schematic view of a strobe light emitter and the surroundings thereof in an automatic focusing single-lens reflex camera having a strobe incorporated therein, to which the present invention is applied.
Figure 2:
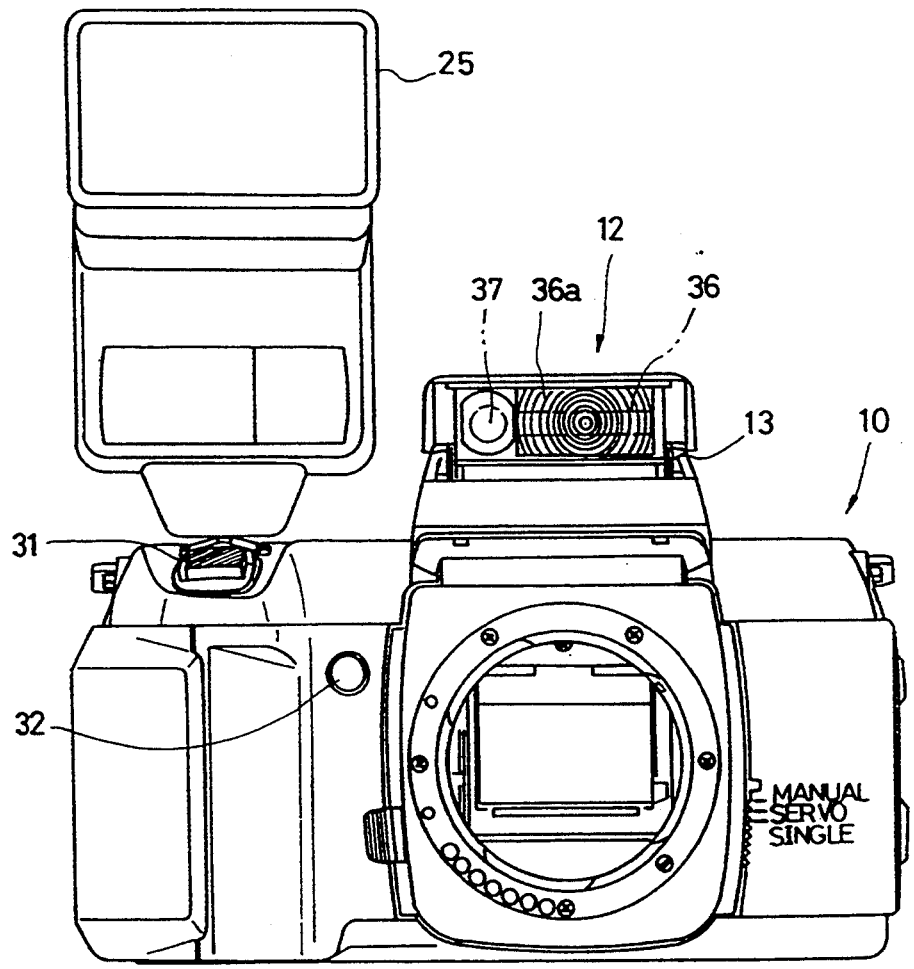
FIG. 2 is a front elevational view of a camera shown in FIG. 1, with an external strobe attached thereto, shown in an operative position in which the strobe light emitter of FIG. 1 of an incorporated strobe projects outward from the camera body.

FIG. 1 schematically shows a powered retractable type of strobe to which the present invention is applied. FIG. 2 shows a single-lens reflex camera which includes a strobe control apparatus according to the present invention. In FIG. 2, the light emitter of the strobe is in the operative position (i.e., light emitting position) in which the light emitter projects outward from the camera body. A detachable external strobe 25, which will be described hereinafter, is attached to the camera body in FIG. 2.

In FIGS. 1 and 2, a camera body 10 is provided, on its upper portion (pentagonal prism 11), with a strobe light emitter 12 which is supported by a supporting mechanism so as that moves between a retracted position, shown at an imaginary line in which the light emitter 12 is retracted in a receiving portion 10a of the camera body 10 and an operative position (i.e., light emitting position) shown at a solid line in which the light emitter 12 protrudes from the receiving portion 10a. Note that only one of the levers 13, which constitute the supporting mechanism, is shown in FIG. 1.

Each of the levers 13 is pivotted at its one end to the rear end of the light emitter 12 through a shaft 13a and at its opposite end to the side wall of the receiving portion 10a provided in the camera body 10 through a shaft 13b. One of the levers 13 has a sector gear 14 having a center located on the center axis of the shaft 13b. The sector gear 14 is in mesh with a pinion 17 of a strobe motor 16 which constitutes a driving means through a gear train 15. Consequently, the rotation of the strobe motor 16 is transmitted to the levers 13 through the gears 17, 15 and 14, so that the strobe light emitter 12 is moved between the retracted position and the operative position through the levers 13, in accordance with the direction of the rotation of the motor 16.

Two limit switches 18 and 19 are provided between the levers 13 and the camera body 10 to detect the retracted and operative positions of the light emitter 12. Namely, the switches 18 and 19 are made ON, when the light emitter comes to the retracted position and the operative position, respectively.

The operation of the strobe motor 16 is controlled by the camera control circuit 20, so that the strobe motor 16 is stopped in accordance with the detection of the sensors (i.e., switches) 18 and 19. The detectors for detecting the retracted position and the operative position of the light emitter are not limited to the limit switches 18 and 19, as illustrated in the drawings, and can be composed of, for example, a combination of a brush and a code plate having coded contacts which selectively come into slide contact with the brush.

The sector gear 14 has a pin 14a provided thereon, extending in parallel with the axis of the shaft 13b. The pin 14a is fitted in an arched groove 10b having a center coaxial to the shaft 13b, formed in the camera body 10. The pin 14a and the arched groove 10b restrict the angular displacement of the sector gear 14. Namely, the terminal angular positions of the levers 13 in the opposite directions are defined by the engagement of the pin 14a with the opposite ends of the arched groove 10b. The terminal angular positions correspond to the operative position and the retracted position of the light emitter 12.

In the illustrated embodiment, an overload detecting circuit 21 of the strobe motor 16 is provided to detect the overload which is produced, for example, when the movement of the light emitter 12 is intercepted by an external force or the like thereby, to stop the motor 16. The overload detecting circuit is contained in the camera control circuit 20, in the illustrated embodiment. Alternatively, it is possible to stop the strobe motor 16 when the overload detecting means detects that no further rotation of the levers 13 beyond the operative position or the retracted position of the light emitter 12 occurs due to the abutment of the pin 14a with the terminal ends of the arched groove 10b.

Figure 3:
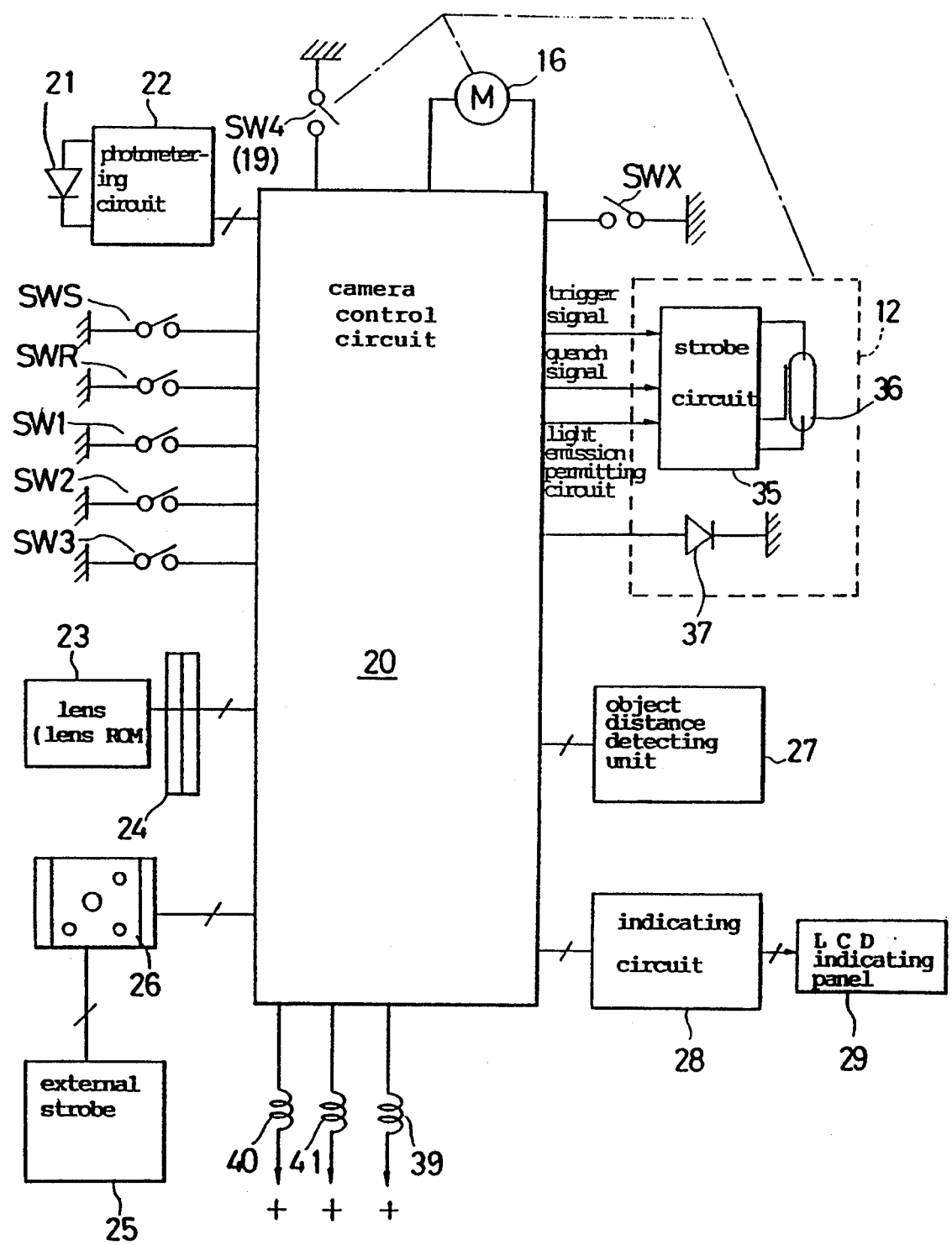
FIG. 3 is a block diagram schematically showing a circuit arrangement of the single-lens reflex camera shown in FIG. 1.

The following discussion will now be addressed to the circuit arrangement of the strobe control apparatus, according to the present invention, with reference to FIG. 3.

The camera control circuit 20, which generically controls the whole operation of the camera usually comprises of a microcomputer. The camera control circuit 20 is connected to a photometering circuit 22, which amplifies and logarithmically compresses the output of photometering sensor 21, which receives object light, to process the output into predetermined photometer signals.

The camera control circuit 20 calculates exposure factors (e.g., object brightness, shutter speed Tv, diaphragm value, camera-shake limit shutter speed, etc.) in accordance with a predetermined algorithm, based on data, such as film sensitivity data and the photometer signals output from the photometering circuit 22.

The camera control circuit 20 reads lens data issued by a lens ROM 23 (or CPU) provided in a photographing lens attached to the camera body in accordance with a serial communication. Based on the read lens data, the kind of a lens attached to the camera body, a focal length of the lens, a minimum diaphragm value and an open diaphragm value thereof, etc., can be obtained. Note that the camera control circuit 20 serves as a lens data input means. The serial communication is carried out through the electrical connection of a plurality of contacts provided on a mount 24.

To the camera control circuit 20 are connected hot shoe contacts to which an external strobe 25 can be detachably attached. In the case of an external strobe 25 having a communication function, the strobe data is inputted from the external strobe 25 to the camera control circuit 20 through the hot shoe 26. The strobe data includes, for example, data which determines whether the external strobe is adaptable to the camera body 10; that is, whether the external strobe interferes with the upward movement of the light emitter 12, and whether the strobe charging is completed, and the guide number. On the other hand, light emission permitting signals, trigger signals and quench signals are input to the external strobe 25 from the camera control circuit 20.

A photometer unit 27 includes a photometer sensor which converts an object image formed by the photographic lens to an electrical signal and outputs the photometering signal necessary for the detection of the object distance (i.e., amount of defocus). The camera control circuit 20 calculates the amount of defocus in accordance with the photometering signal and the lens data to perform the AF (Automatic Focusing) process for driving a focusing lens of the photographic lens to the focal position through an AF mechanism.

An LCD panel 29 is provided on the outer face of the camera body 10 within a finder field of view and is controlled by the camera control circuit through an indication circuit 28. In the illustrated embodiment, the LCD panel 29 indicates, at least the permission and prohibition of the light emission of the strobe. Of course, it is possible to indicate other information on the photographing function of the camera, such as, exposure program modes, shutter speed, diaphragm value, and "out of focus" and in focus, etc.

Various switches are connected to the camera control circuit 20, including a photometer switch (first switch) SWS, a release switch (second switch) SWR, a self timer switch SW1, a light emission selecting switch SW2, an improper lens releasing switch SW3 and an upward movement detecting switch SW4, etc.

The photometer switch SWS and the release switch SWR are associated with the release button 31, so that when the release button is depressed halfway, the photometer switch SWS is turned ON and when the release button is fully depressed, the release switch SWR is turned ON, respectively. When the photometer switch SWS is turned ON, the photometering circuit 22 and the object distance detecting unit 27, etc., begin operating. When the release switch SWR is made ON, the operation is changed to the release operation.

The self timer switch SW1 operates the self timer, so that when the self timer switch SW1 is ON, the mode becomes a self timer mode, in which when the release switch SWR is turned ON, the self timer operation starts and the release operation starts a predetermined time thereafter.

The light emission selecting switch SW2 changes the light emission mode of the strobe. When no light emission selecting switch SW2 is turned ON, the judgement whether the strobe light should be emitted in accordance with the brightness data of the object detected by the photometering circuit 22 and the lens data read by the ROM 23 is effected at an automatic light emission mode. Conversely, when the light emission selecting switch SW2 is turned ON, the strobe light emission is compulsively controlled at a compulsive light emission mode. In the compulsive light emission mode, when the calculated shutter speed is higher than the strobe synchronous speed, the camera control circuit 20 sets the shutter speed upon releasing to be identical to the strobe synchronous speed.

The improper lens releasing switch SW3 selects whether the lens data read by the lens ROM 23 should be utilized to judge the strobe light emission. The improper lens releasing switch SW3 is actuated, for example, when the strobe light should be compulsively emitted in spite of the angle of view of the attached lens being larger than the strobe illuminating angle.

The upward movement detecting switch SW4 is turned ON when the light emitter 12 of the strobe shown in FIG. 1 is fully moved up to the light emitting position. It should be appreciated that the upward movement detecting switch SW4 and the limit switch 19 can comprise a single switch.

A strobe circuit 35, which causes the strobe (light emitting tube 36) to emit the strobe light, an auxiliary light emitting LED 37 adjacent to the light emitting tube 36, and the hot shoe 26 are connected to the camera control circuit 20. The camera control circuit 20 outputs a light emission permitting signal, a trigger signal and a quench signal to the strobe circuit 35 and the hot shoe 26, respectively. The camera control circuit 20 serves as a strobe control means.

The light emission permitting signal permits the light to be emitted when the necessary conditions for emitting the strobe light are satisfied, so that the incorporated and external strobes commence the preparatory operations for the light emission, such as strobe charging, upon receipt of the light emission permitting signal.

The trigger signal is a signal for emitting the strobe light. The quench signal is a signal for stopping the light emission when the amount of light by the strobe reaches an optimum value. The auxiliary light emitting LED 37 emits a contrast pattern onto the object to assist the measurement of the object distance by the object distance measuring unit 27 when the object brightness or contrast is small. To the camera control circuit 20, which releases a mechanical charge of a mirror and shutter curtains (leading curtain and trailing curtain) when the release switch SWR is turned ON. Leading and trailing curtain magnets 40 and 41 are also connected to the control circuit 20, which engage with the leading curtain and trailing curtain in place of the mechanical engagement and sequentially release the engagement thereby, that moves the leading and trailing curtains so as to obtain a desired shutter speed, respectively.

The X contact switch SWX is a switch for emitting strobe light from on external strobe which has no communication function and is turned ON after the movement of the leading curtain ends to emit the strobe light from the external strobe through the hot shoe 26.

The strobe control apparatus of a camera of the present invention, as constructed above operates as follows (See 4 and 5).

The general operation of the apparatus will first be briefly explained below.

In the strobe control apparatus of the invention, when two requirements, that firstly, the calculated shutter speed is below a predetermined value (e.g., camera-shake limit shutter speed), resulting in the necessity of the auxiliary light by the strobe, and that secondarily, the photographic lens attached to the camera is adaptable to the incorporated strobe are satisfied, the light emitter 12 is moved up to the operative position to emit the light and then is moved down to the retracted position upon completion of the light emission.

In the case of the compulsive light emission, when the calculated shutter speed is higher than the strobe synchronous speed, the shutter speed is set to the strobe synchronous speed.

If the light emitter 12 does not move to the operative position when using the incorporated strobe; the emission of light of the incorporated strobe is stopped, so that the exposure is effected at an optimum shutter speed and a diaphragm value, corresponding to the optimum exposure value, with or without the emission of light by the external strobe 25 when the external strobe 25 is attached to the camera body or no external strobe is attached to the camera body, respectively.

In the illustrated embodiment, there are four light emission modes; a first mode in which both the incorporated strobe and the external strobe emit light, a second mode in which only the external strobe emits light, a third mode in which only the incorporated strobe emits light, and a fourth mode in which no light is emitted from the incorporated and external strobes.

Generally speaking, since the strobe light is required when the shutter speed is below a camera-shake limit shutter speed Tv, whether or not the strobe should be used is preferably determined in accordance with the calculated shutter speed and the camera-shake limit shutter speed Tv based on the focal length of the lens.

A more detailed explanation for the operation of the control apparatus of the present invention will now be given below with reference to the flow charts shown in FIGS. 4 (4A, 4B and 4C) and 5. Note that the operation is performed in accordance with a program stored in a memory of the microcomputer of the camera control circuit 20.

When the program starts under the condition that a picture can be taken, for example by actuating a main switch, the camera control circuit 20 inputs the respective switch data (ON or OFF) of the switches SWS, SWR and SW1 at step S1 and waits until the photometer switch SWS is turned ON (steps S1 and S3).

If the photometer switch SWS is turned ON, the switch data of the light emission selecting switch SW2 is inputted to the microcomputer (steps S5 and S7). If the light emission selecting switch SW2 is turned ON, the strobe light emission mode is changed to the compulsive light emission mode (step S9). If and if the light emission selecting switch SW2 is OFF, the strobe light emission mode is changed to the automatic light emission mode (step S10). If the strobe light emission mode is the compulsive light emission mode, the shutter speed upon releasing is set to the strobe synchronous speed at which the shutter speed is synchronous with the light emission of the strobe, so that the strobe emits the light upon releasing. On the other hand, if the mode is the automatic light emission mode, the strobe light is emitted only when it is judged that the strobe light is necessary, in accordance with the control mentioned below.

Thereafter, the camera control circuit 20 reads the lens data stored in the lens ROM 23 (step S11) and the signal transmission is effected between the camera body and the external strobe 25 through the hot shoe 26 (step and S13). The data stored in the lens ROM 23 includes the kind of lens and focal length, etc. The data output from the external strobe 25 includes the characteristics thereof, such as whether the external strobe 25, when attached to the camera body 10, interferes with the upward movement of the light emitter 12 toward the operative position, and the guide number, etc. Note that when the external strobe having no communication function is attached to the camera body, the attachment of the external strobe is detected in accordance with the signal level of the electrical contacts of the hot shoe.

The camera control circuit 20 calculates the exposure factors, such as a shutter speed in accordance with the photometer signal output from the photometering circuit 22 and the film sensitivity data, etc., at steps S15 and S17.

Thereafter, the camera control circuit 20 causes the LCD panel 29 to indicate the various values set in the camera through the indicating circuit 28 (step S19). The indicated information includes the strobe light emission mode, whether the attached lens is correct or wrong, and whether the external strobe is correct or wrong, etc.

Thereafter, whether the self timer switch SW1 is ON is checked. That is, whether the mode is set to the self timer mode is checked at step S23. If the mode is not the self timer mode (i.e., the mode is the normal photographic mode), the control skips to step S32. If the mode is the self timer mode, whether the operation is the self timer operation is checked at step S24. If the operation is not the self timer operation, whether or not the release switch SWR is ON is checked (step S25). If the release switch SWR is ON, the self counter starts. That is, the self timer operation starts (step S26). The operation under the self timer mode is indicated by the blinking of the external LED 32 (FIG. 3) and the decrement of the self counter is performed (steps S28 and S29).

Thereafter, whether the self counter becomes 0 is checked at step S31. If the counter is not 0, control is returned to step S1 to repeat the above mentioned operations. If the counter is 0, control proceeds to step S33. At step S24, if the self timer operation has already commenced, control skips to step S28 to continue the self timer operation. Even in the self timer mode, if the release switch SWR is not turned ON, control is returned from step S25 to step S1.

Conversely, if the mode is not the self timer mode, that is, if the mode is a normal photographing mode, control proceeds to step S32 from step S23 to check whether the release switch SWR is turned ON. If the release switch SWR is off, control returns to step S1 to repeat the operations of steps S1~S23 and S32. If the release switch SWR is ON, control proceeds to step S33.

At step S33, whether the calculated shutter speed is below a predetermined value (e.g., camera-shake limit speed) is checked. If the calculated shutter speed is not below a predetermined value, control skips to step S45 (AF process), since neither the main strobe light emission nor the auxiliary strobe light emission are necessary.

Conversely, if the calculated shutter speed is below a predetermined value, it is determined whether the external strobe is attached (step S35). If no external strobe is attached, control proceeds to step S39 to perform the process of moves the light emitter 12 upward to the operative position. If the external strobe is attached, it is determined whether the properties thereof meet the associated camera (step S37). If the external strobe meets the camera requirements, control returns to step S39, and if the external strobe does not meet the camera requirements, control skips to step S45. The term "meet" referred to herein means that the external strobe does not interfere with the upward movement of the light emitter 12 to the operative position.

At step S39, the process of moves the light emitter upward is performed. As a result, if the upward movement detecting switch SW4 is ON, that is, if the light emitter 12 comes to the operative position, the auxiliary light emitting LED 37 is illuminated (step S43) and control proceeds to step S45 (AF process). If the upward movement detecting switch SW4 is OFF at step S37, control proceeds to the AF process, since no light emission can be effected.

At step S45, the object distance is detected through the object distance detecting unit 27, so that the AF process is performed through the AF mechanism that moves the focusing lens (not shown) of the photographing lens to the focal position in accordance with the detected object distance (amount of defocus). Thereafter, it is determined whether the focusing lens is focused (step S47). If the focusing is finished, control proceeds to step S49. Conversely, if no focusing is achieved at step S47, control returns to step S1 to repeat the above mentioned operations until the focusing lens is moved exactly to the focal position.

The operations of steps S1~S23~S31, S33~S47 and S1 are repeated until the object is "in focus" after the self counter becomes 0 at the self timer mode. On the other hand, in the normal photographing mode, the loop operations of steps S1~S23, S32~S47 and S1 are repeated until the object is "in focus" after the release switch SWR is turned ON. Note that although the above discussion has been directed to a focus priority mode, in the case of a release priority mode, control proceeds to step S49 from step S45, regardless of the camera being "in focus".

At step S49, it is determined whether the mode is the compulsive light emission mode. If the mode is the compulsive light emission mode, control skips to step S61, since the incorporated strobe is expected to emit the strobe light, regardless of kind of the photographing lens and the existence of the external strobe. If the mode is not the compulsive light emission mode, control proceeds to step S51.

At step S51, it is determined whether the calculated shutter speed is below a predetermined value. If the calculated shutter speed is not below a predetermined value, control skips to step S77 to prohibit the emission of the strobe light and set the shutter speed upon releasing to be identical to the calculated shutter speed, since no strobe light is necessary. Thereafter, control proceeds to step S69 to perform the exposure.

If the calculated shutter speed is below a predetermined value, it is determined whether the external strobe is attached (step S53). If the external strobe is attached, it is determined whether the external strobe meets the camera requirements (step S54). If the external strobe does not meet the camera requirements, since the light emitter 12 can not move to the operative position, control skips to step S75 to prohibit the light emission of the incorporated strobe and set the shutter speed upon releasing to be identical to to the strobe synchronous speed. Thereafter, control proceeds to step S69 to perform the exposure.

If the external strobe meets the camera requirements, it is determined the property of the attached photographing lens meets the property of the incorporated strobe (step S55). If the property of the attached photographing lens does not meet the property of the incorporated strobe, control proceeds to step S75 to prohibit the light emission of the incorporated strobe, since even if the strobe light is emitted, no object is correctly illuminated with the strobe light. Conversely, if the property of the attached photographing lens meets the property of the incorporated strobe, control proceeds to step S56 to permit the light emission of the incorporated strobe and set the shutter speed upon releasing to be identical to the strobe synchronous speed. Thereafter, control proceeds to step S63.

If the external strobe is not attached at step S53, it is determined whether the incorporated photographing lens meets the camera requirements (step S57). If the incorporated photographing lens meets the camera requirements, control proceeds to step S61. If the incorporated photographing lens does not meet the camera requirements, control proceeds to step S59 to check whether the improper lens releasing switch SW4 is ON. If the improper lens releasing switch SW4 is OFF, control proceeds to step S77, since no incorporated strobe emits the strobe light. Conversely, if the improper lens releasing switch SW4 is ON, control is returned to step S61 to emit the strobe light of the incorporated strobe.

At step S61, the incorporated strobe is permitted to emit the strobe light and the shutter speed upon releasing is set to be identical to the strobe synchronous speed. Thereafter, it is determined whether the upward movement detecting switch SW4 is ON. That is, step S63 determines whether the light emitter 12 comes to the operative position. If the light emitter 12 is not moved to the operative position, the strobe motor 26 is driven that moves the light emitter up to the operative position (step S65). Thereafter, it is again determined whether the upward movement detecting switch SW4 is ON in step S67.

If the upward movement detecting switch SW4 is ON, the exposure is performed under the conditions determined in step S61 (or steps S56, S75 and S77) at step S69. After the exposure is completed, the light emitter 12 is moved down to the retracted position, if the light emitter 12 is in the operative position (step S71).

If the light emitter 12 is not moved to the operative position for some reason at step S65, so that no upward movement detecting switch SW4 is ON, control proceeds to step S73 from step S67.

At step S73, it is determined whether the external strobe is attached. If no external strobe is attached, the incorporated strobe is prohibited from emitting the strobe light and the shutter speed upon releasing is set to be identical to the calculated shutter speed, so that the exposure is performed without emitting the strobe light (steps S77 and S69)- On the other hand, if the external strobe is attached, the external strobe emits the strobe light after the light emission of the incorporated strobe is prohibited and after the shutter speed upon releasing is set to be identical to the strobe synchronous speed to perform the exposure (steps S75 and S69).

Upon completion of the exposure, the light emitter 12 is moved down to the retracted position, if the light emitter is in the operative position (step S71).

Figure 5:
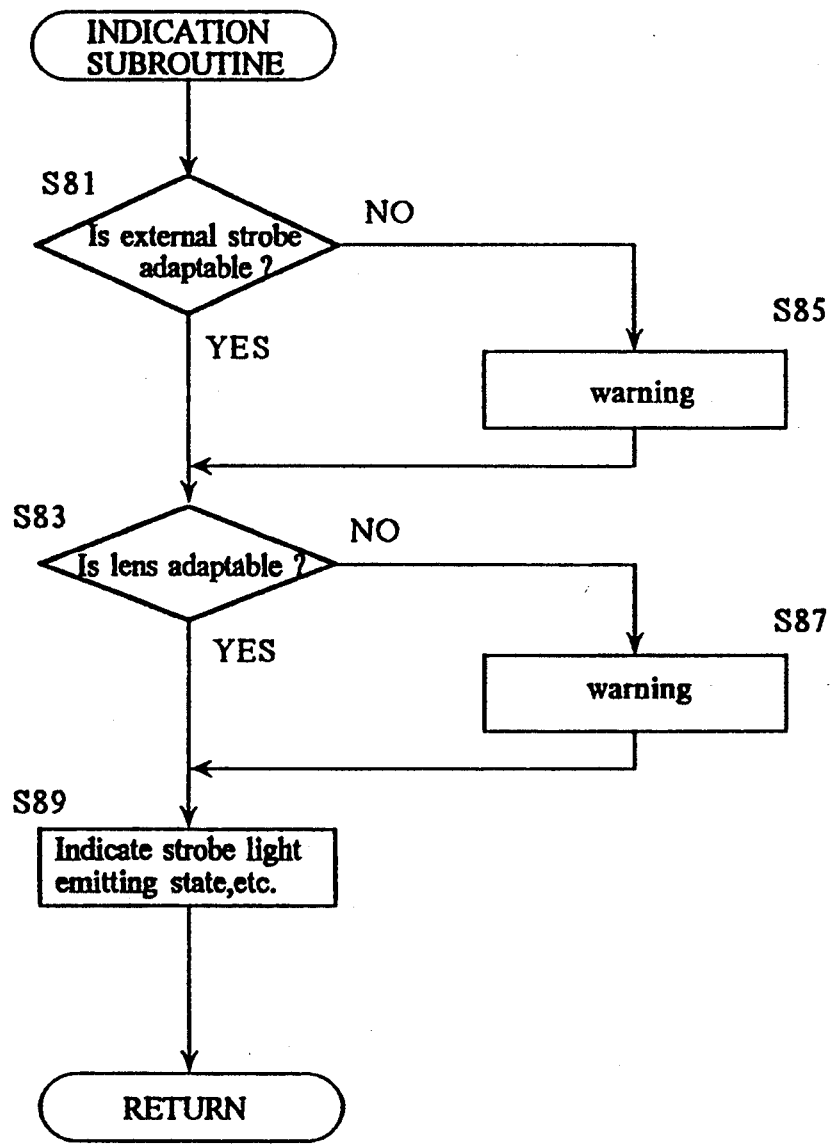

FIG. 5 shows a subroutine for the indicating operation. If the light emitter 12 is not in the operative position, if the external strobe 25 is not adaptable to the associated camera, or if the attached lens is not appropriate, these a warning indicator is illuminated (steps S81~S87). The determination that the light emitter 12 is not in the operative position is effected in accordance with the detection of the upward movement detecting switch SW4, as mentioned before. At the indication subroutine, the above-mentioned four light emission modes of the strobe and the set data of the camera are indicated at step S89.

As can be seen from the above discussion, according to the present invention, the permission of the emission of the strobe light is determined in accordance with the object brightness and the lens data. When strobe light emission is necessary, the light emitter 12 is automatically moved up to the operative position to emit the strobe light upon exposure. If the light emitter can not move to the operative position for some reason, for example, by the interference of the light emitter 12 with the external strobe, the incorporated strobe is prohibited from emitting the strobe light, and the strobe light is emitted only by the external strobe to perform the exposure at an optimum shutter speed and an optimum diaphragm value.

If the light emitter 12 is not moved to the operative position when the external strobe is not attached, the incorporated strobe is prohibited from emitting the strobe light, so that the exposure is effected without the strobe light. Consequently, no photographing error occurs due to an abnormal illumination of the incorporated strobe, and the possibility that a photographer may miss a shutter chance due to the prohibition of exposure can be decreased.

Furthermore, in the case of a camera to which the external strobe can be attached, if the light emitter of the incorporated strobe can not move to the operative position, only the incorporated strobe is prohibited from emitting the strobe light and the strobe light is emitted from the external strobe, thus resulting in a normal strobe effect.

Although, the light emitter 12 is supported by the retractable link mechanism having the levers 13 in the illustrated embodiment, is the supporting mechanism not limited thereto and can be made of, for example, a pop-up mechanism. Furthermore, the gear mechanism for moving the light emitter 12 between the retracted position and the operative position can be replaced with another mechanism, such as a cam mechanism. Alternatively, the movement of the light emitter 12 from the retracted position to the operative position, or, from the operative position to the retracted position can be done by a spring.

Although whether or not the strobe should be used at the automatic light emission mode is judged in accordance with the shutter speed obtained based on the object brightness, etc., in the illustrated embodiment, the judgement can be simply done in accordance with the object brightness.

Figure 6A:
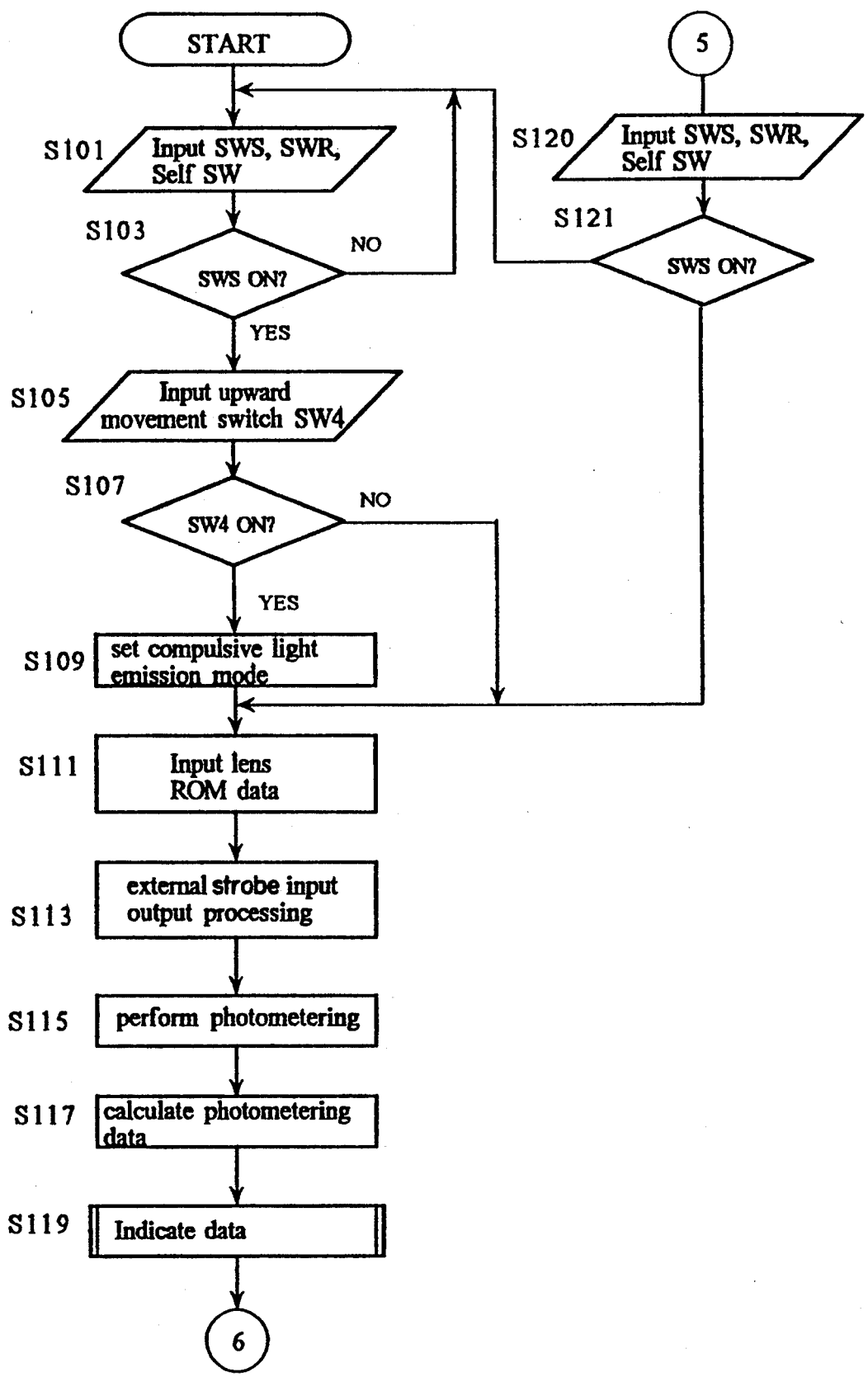
FIGS. 6A, 6B and 6C are flow charts of the operations of a single-lens reflex camera, according to another embodiment of the present invention.
Figure 6B:
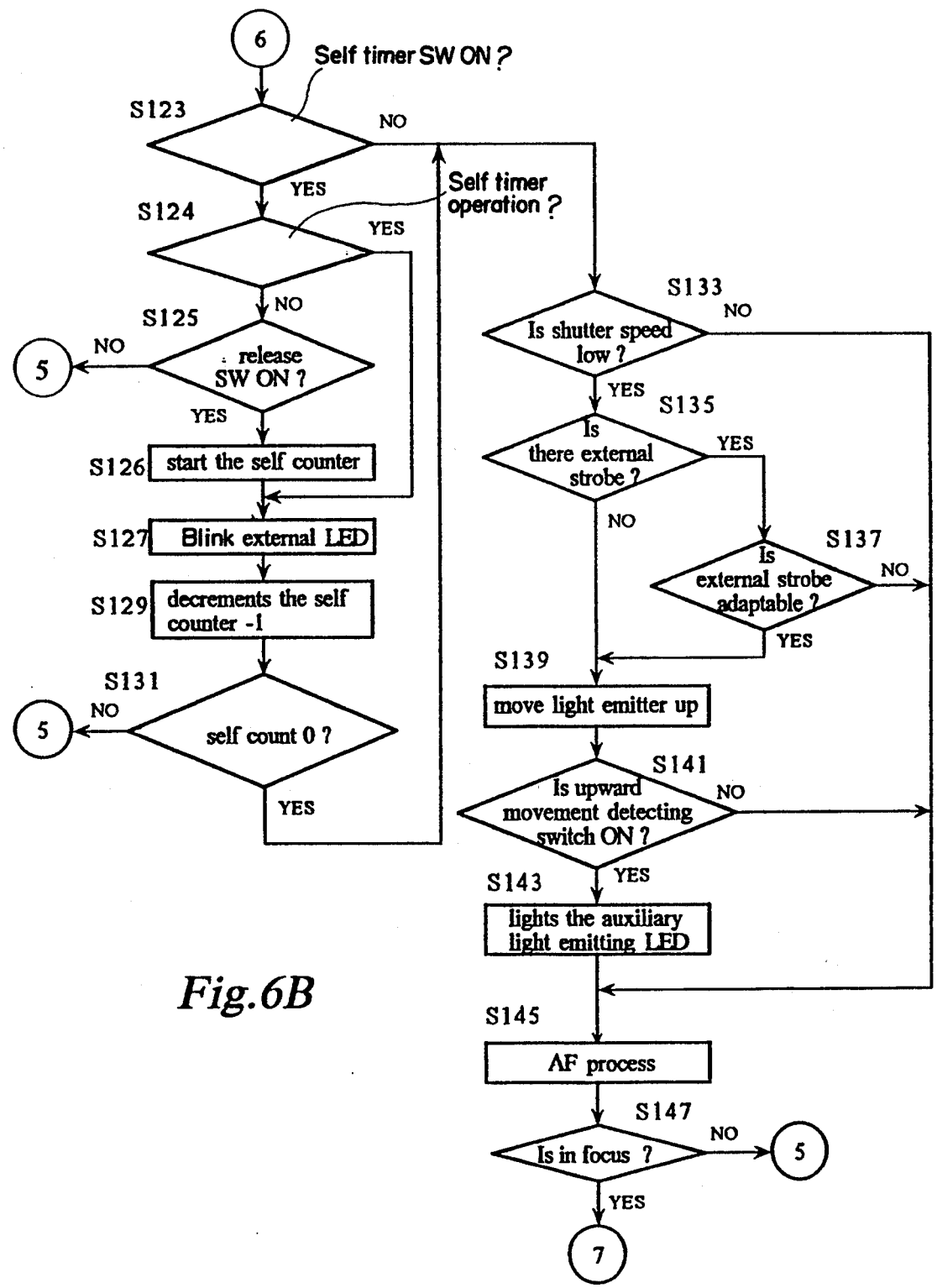
Figure 6C:
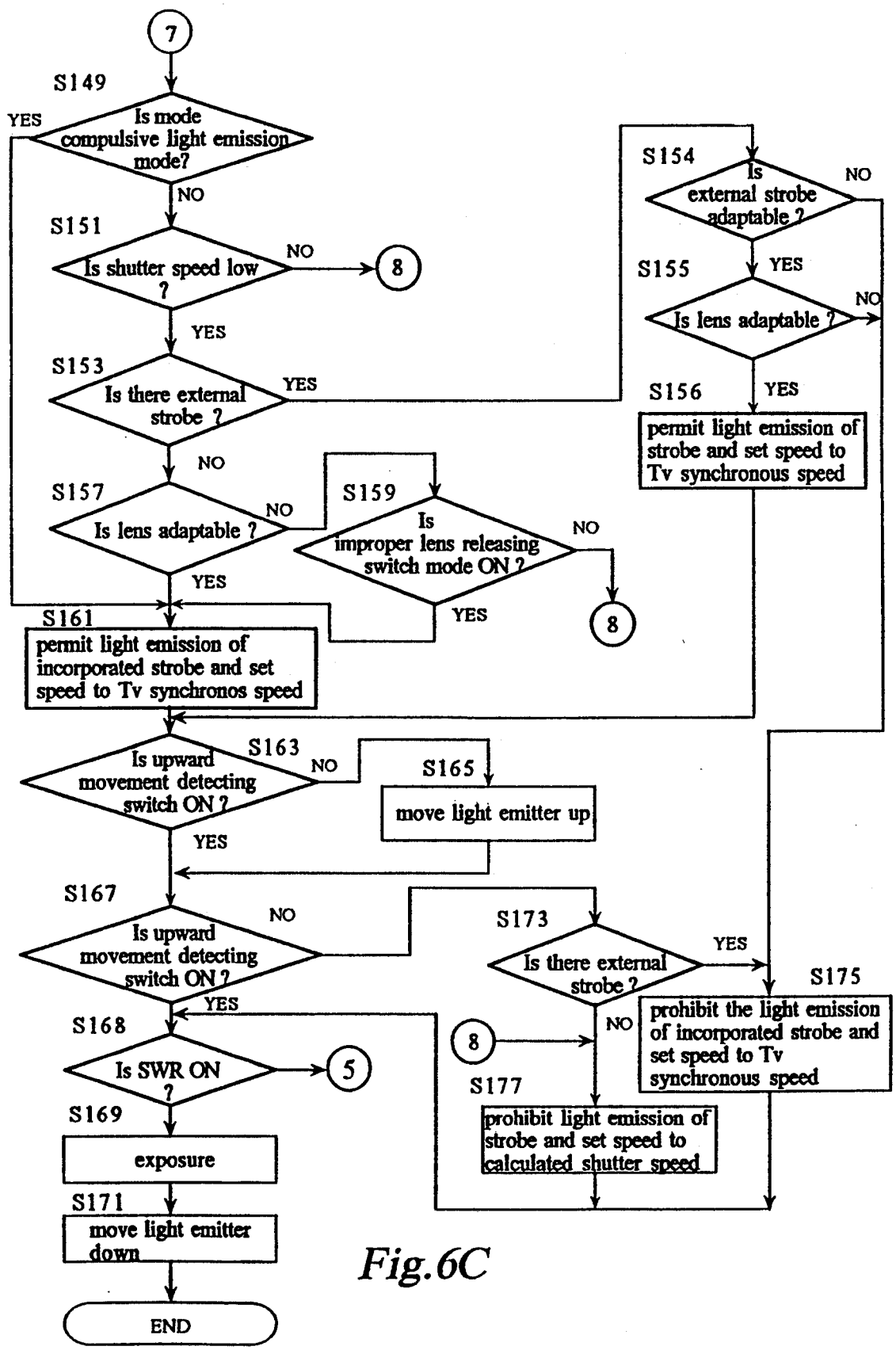

FIGS. 6A through 6C show a modified embodiment in which the automatic light emission mode and the compulsive light emission mode can be switched without using the mode selection switch.

Figure 4A:
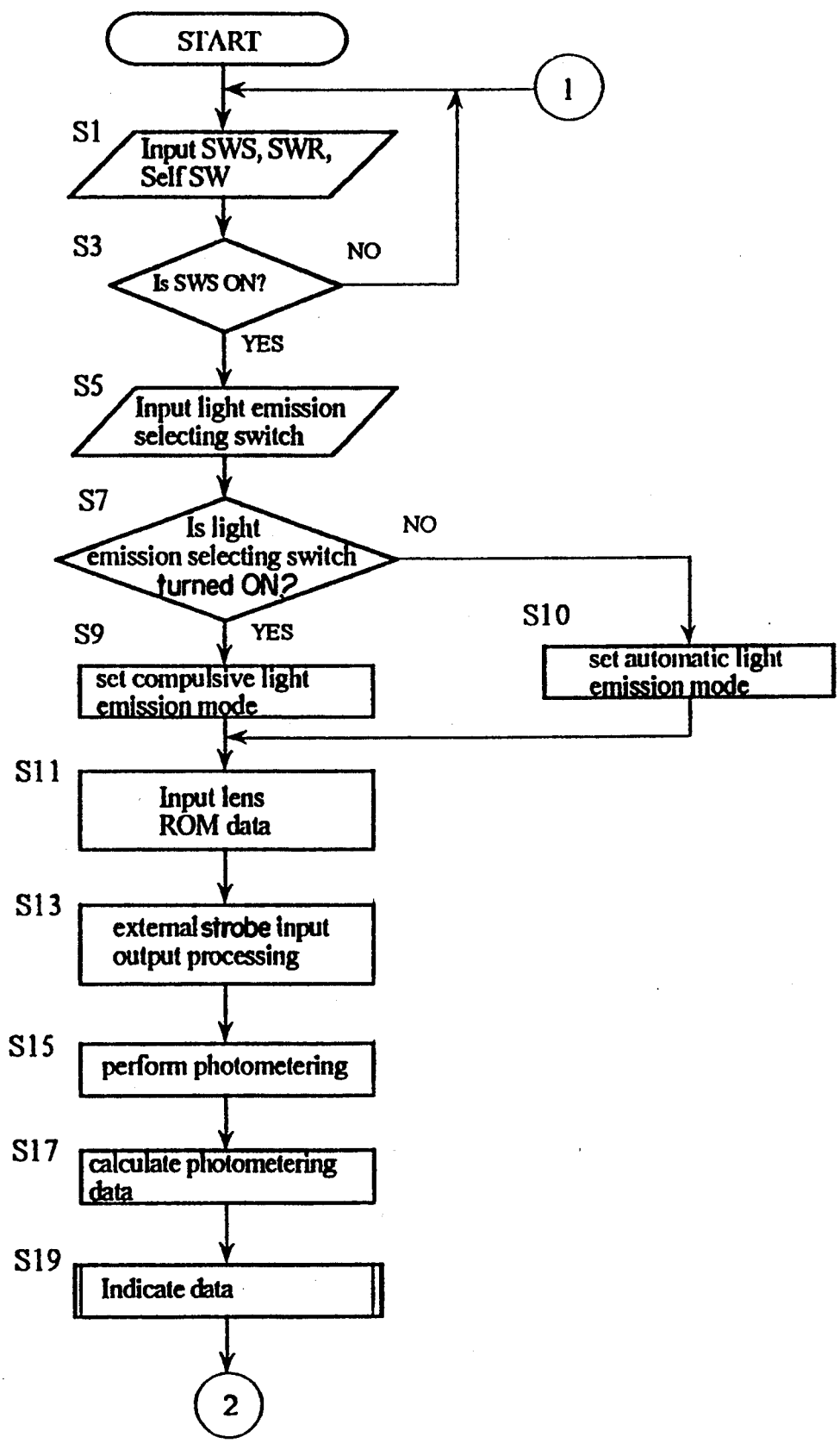
FIGS. 4A, 4B, 4C and 5 are flow charts describing operations of the single-lens reflex camera shown in FIG. 1.
Figure 4B:
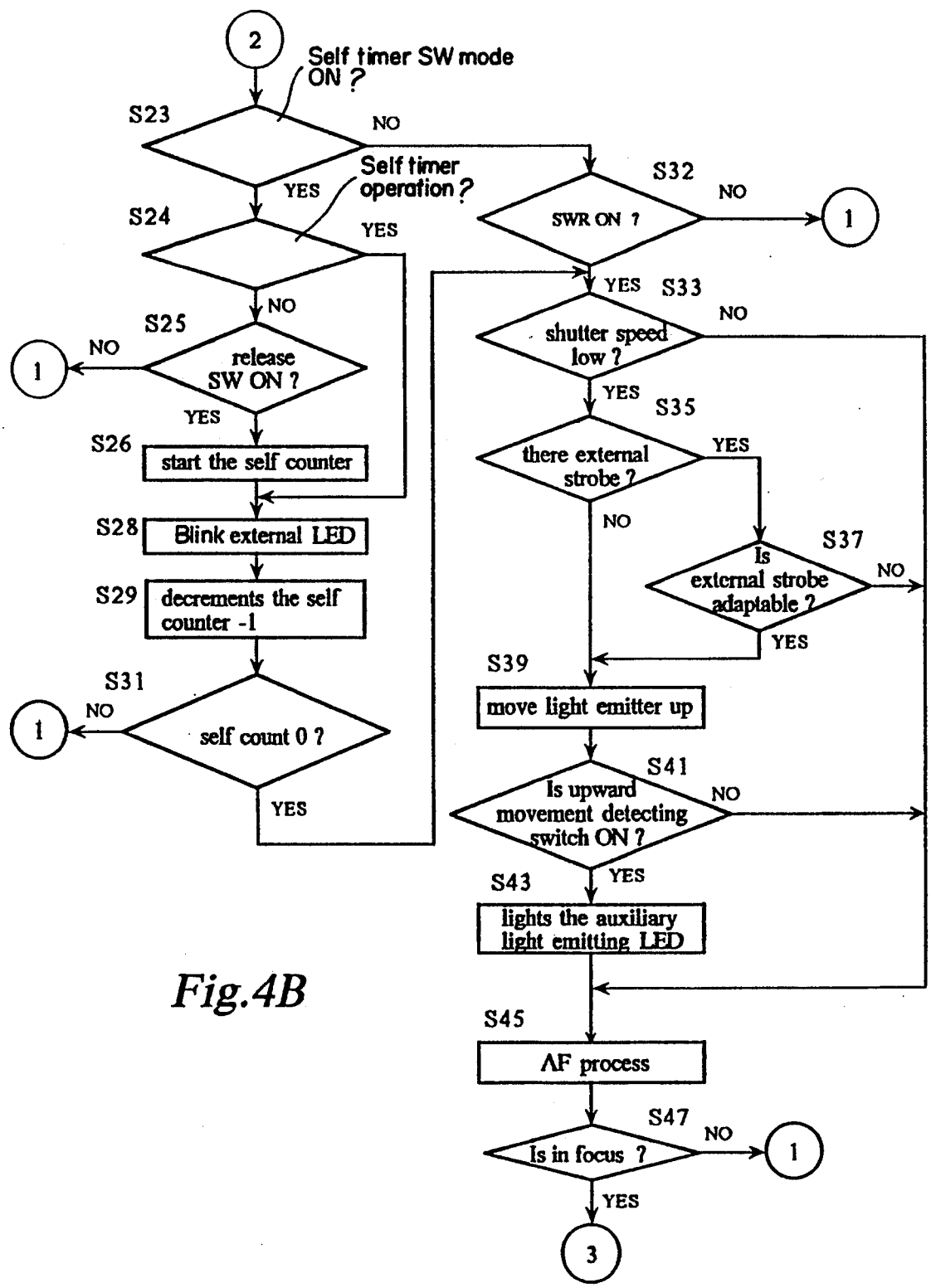
Figure 4C:
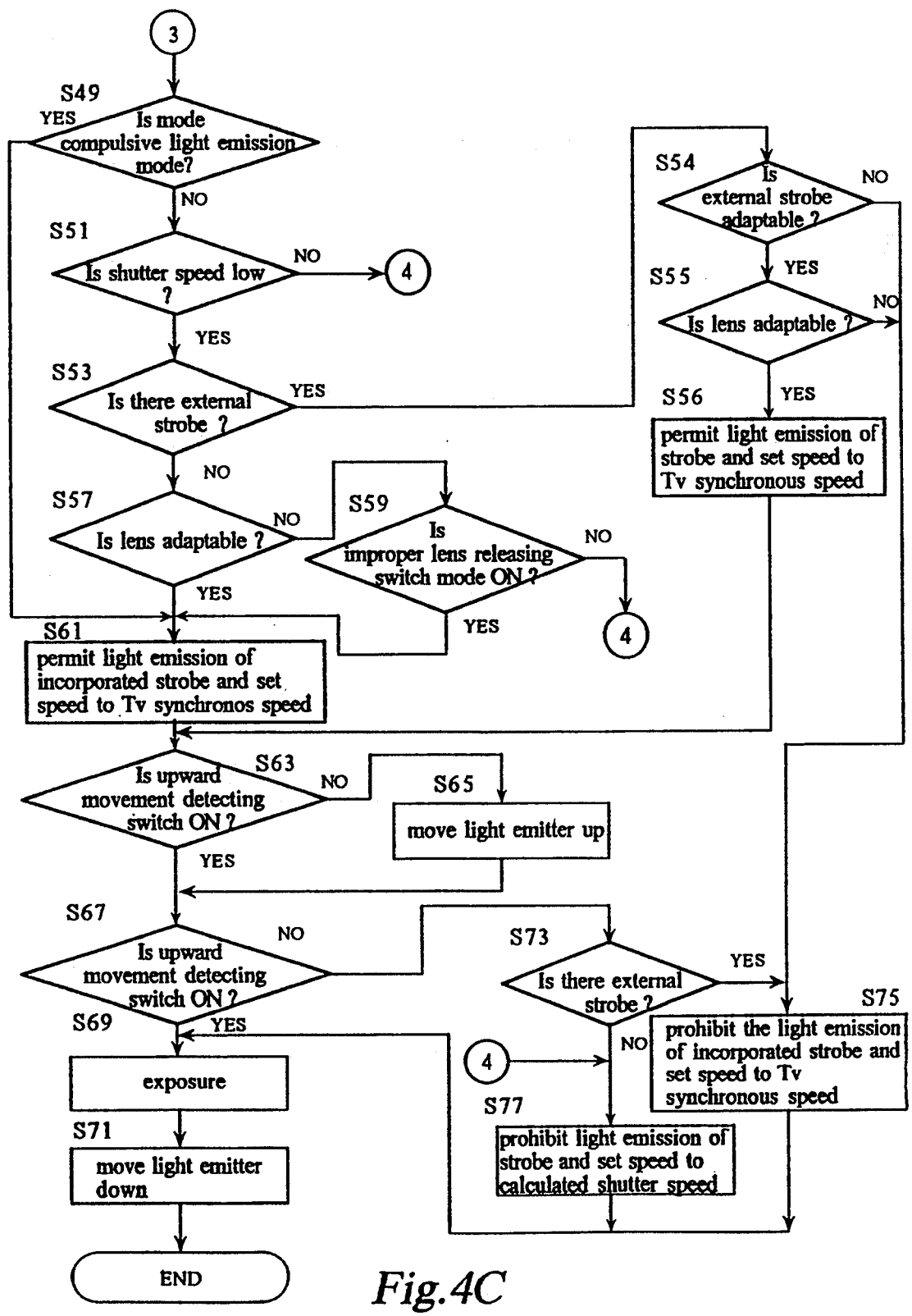

In FIGS. 6A through 6C, the basic photographic operation is similar to that shown in FIGS. 4A through 4C mentioned above. Accordingly, the same steps as those in FIGS. 4A through 4C are designated with the same reference numerals of the last two digits.

In the modified embodiment, the automatic light emission mode is the initial mode. The light emitter 12 is usually held in the retracted position. When the photometering switch SWS is ON, the exposure factor is calculated in accordance with a predetermined algorithm, based on the normal object brightness data Bv and the film sensitivity, etc. If the calculated shutter speed Tv is below a predetermined value, the strobe is permitted to emit the strobe light. Conversely, if the calculated shutter speed Tv is above a predetermined value, the strobe is prohibited from emitting the strobe light.

After the photometering switch SWS is turned ON, when the calculated shutter speed Tv is below a predetermined value and when the necessary conditions for emitting the strobe light are satisfied, the light emitter is moved to the operative position, so that when the release switch SWR is turned ON, the strobe light is emitted.

At the operative position of the light emitter 12, when the photometering switch SWS is first turned OFF and is then turned ON again, the compulsive light emission mode is set, so that strobe light can be emitted, regardless of the calculated shutter speed, i.e., even at a high shutter speed. At the compulsive light emission mode, when the shutter speed upon releasing is higher than the strobe synchronous speed, the shutter speed is set to be identical to the strobe synchronous speed, so that the exposure can be effected at an optimum exposure value, with the strobe light.

When the photometering switch SWS is turned ON and OFF at the operative position of the light emitter 12, the compulsive light emission mode is set. Also, when the light emitter 12 is manually moved to the operative position, the mode becomes the compulsive light emission mode.

To realize the above-mentioned operations, in the modified embodiment shown in FIGS. 6A through 6C, the light emission mode selecting process (corresponding to steps S5, S7, S9 and S10 in FIG. 4A) by the mode selecting switch SW1 is performed by the operations of steps S105, S107 and S109, in which the compulsive light emission mode is set only when the light emitter 12 is in the operative position. Thus, the compulsive light emission mode is automatically set when the light emitter 12 is in the operative position.

There is no step corresponding to step S32 of FIG. 4B in FIG. 6B. Namely, at the normal photographing mode, the AF process and the strobe setting process are performed when the photometering switch SWS is turned ON. The state of the release switch SWR is checked immediately before the exposure process (step S169), i.e., after all the photographing preparatory operations are completed (steps S168 and S169).

When the photometering switch SWS is turned ON, but the release switch SWR is not turned ON, control skips steps S105, S107 and S109 and is returned to step S111 from step S168 (steps S120 and S121). Consequently, when the light emitter 12 is in the operative position, the compulsive light emission mode is maintained. When the light emitter 12 is not in the operative position, the automatic light emission mode is maintained. Namely, after the light emitter 12, which has been in the retracted position is moved to the operative position, the compulsive light emission mode is automatically set when the photometering switch SWS is first turned OFF and is then turned ON again thereafter. Consequently, the mode can be switched from the automatic light emission mode to the compulsive light emission mode without the mode selecting switch SW1.

The following discussion will be directed to a third embodiment of the present invention, which includes an indicating device which visibly indicates the self timer mode, regardless of the position of the object, with reference to FIGS. 7 through 12. In the third embodiment, the elements corresponding to those in the first embodiment are designated with the same reference numerals.

Figure 8:
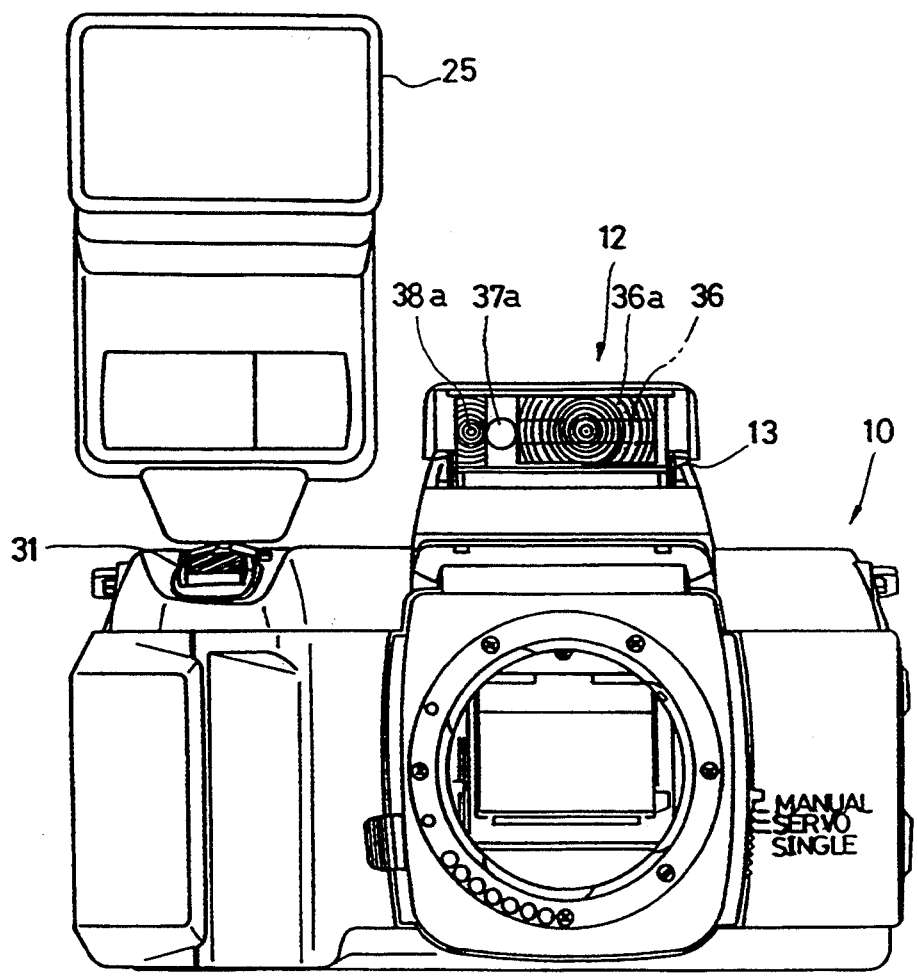

A self timer indicating LED 38 is provided in the light emitter 12, in parallel with the auxiliary light emitting diode (LED) 37. A condenser lens 37a of a condensing optical system is provided in front of the auxiliary LED 37 to make it possible to illuminate a further object. A diffusion lens 38a of a diffusion optical system is provided in front of the self timer indicating LED 38 (FIG. 8). The self timer indicating LED 38 blinks when the self timer operation commences the self timer mode by the camera control circuit 20. The light emitter 12 is moved to the operative position before it blinks.

Figure 7:
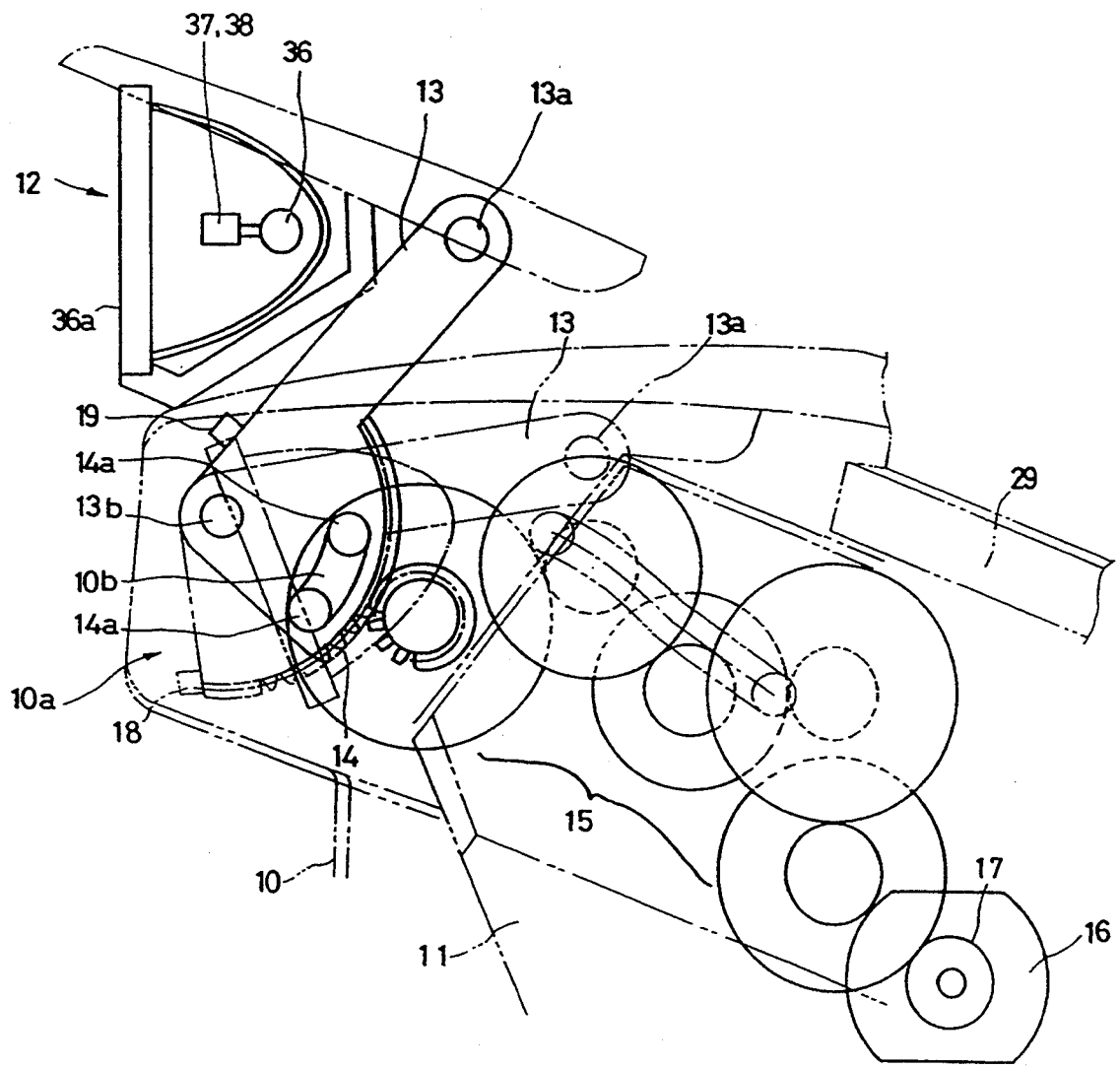
FIGS. 7, 8 and 9 are views similar to FIGS. 1 through 3, according to a third embodiment of the present invention which is applied to a strobe-incorporated camera having a self timer photographing function.
Figure 9:
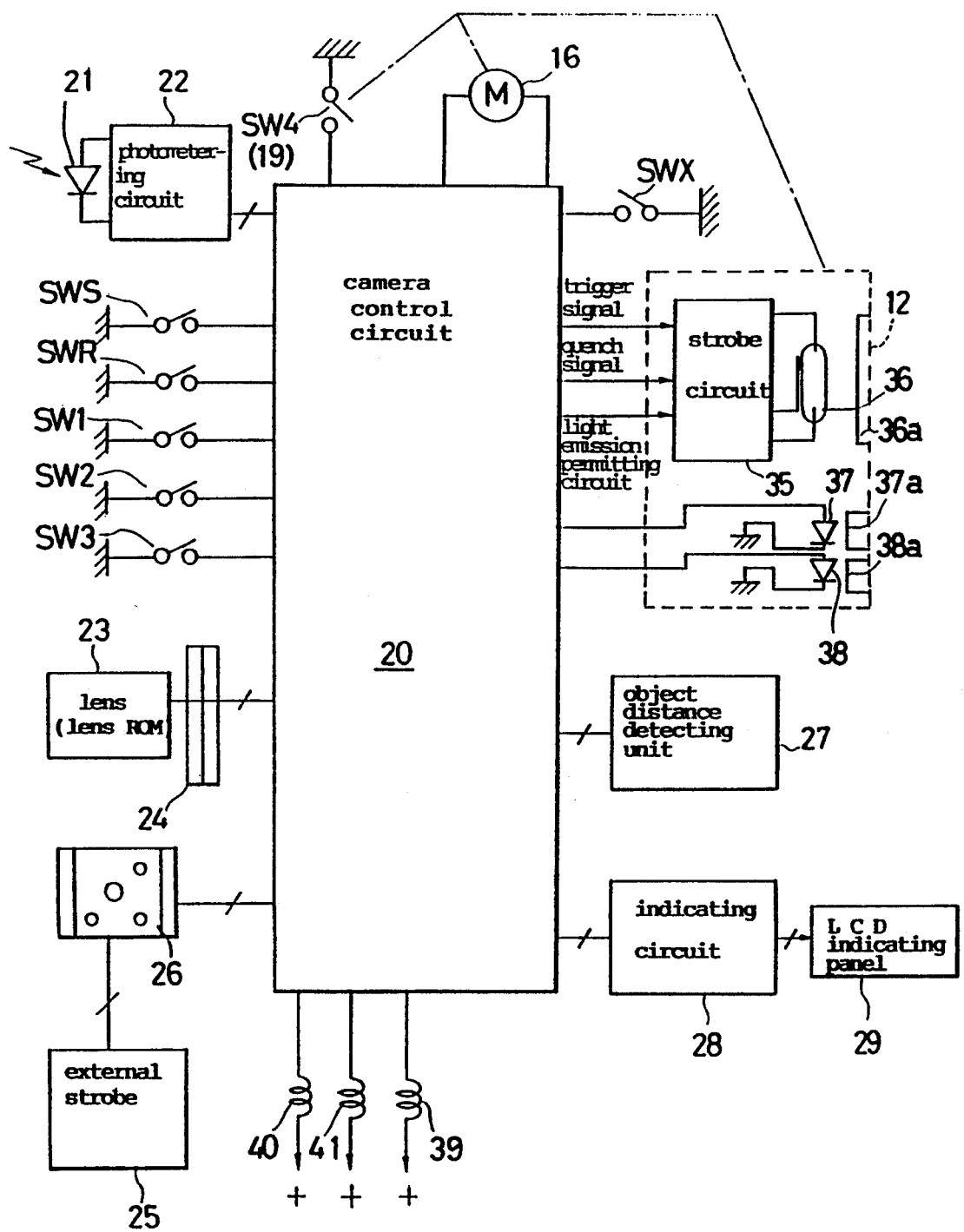

The operations of the third embodiment, shown in FIGS. 7 through 9 will be described below, with reference to the flow charts shown in FIGS. 10A and 10B and FIG. 4C.

Figure 10A:
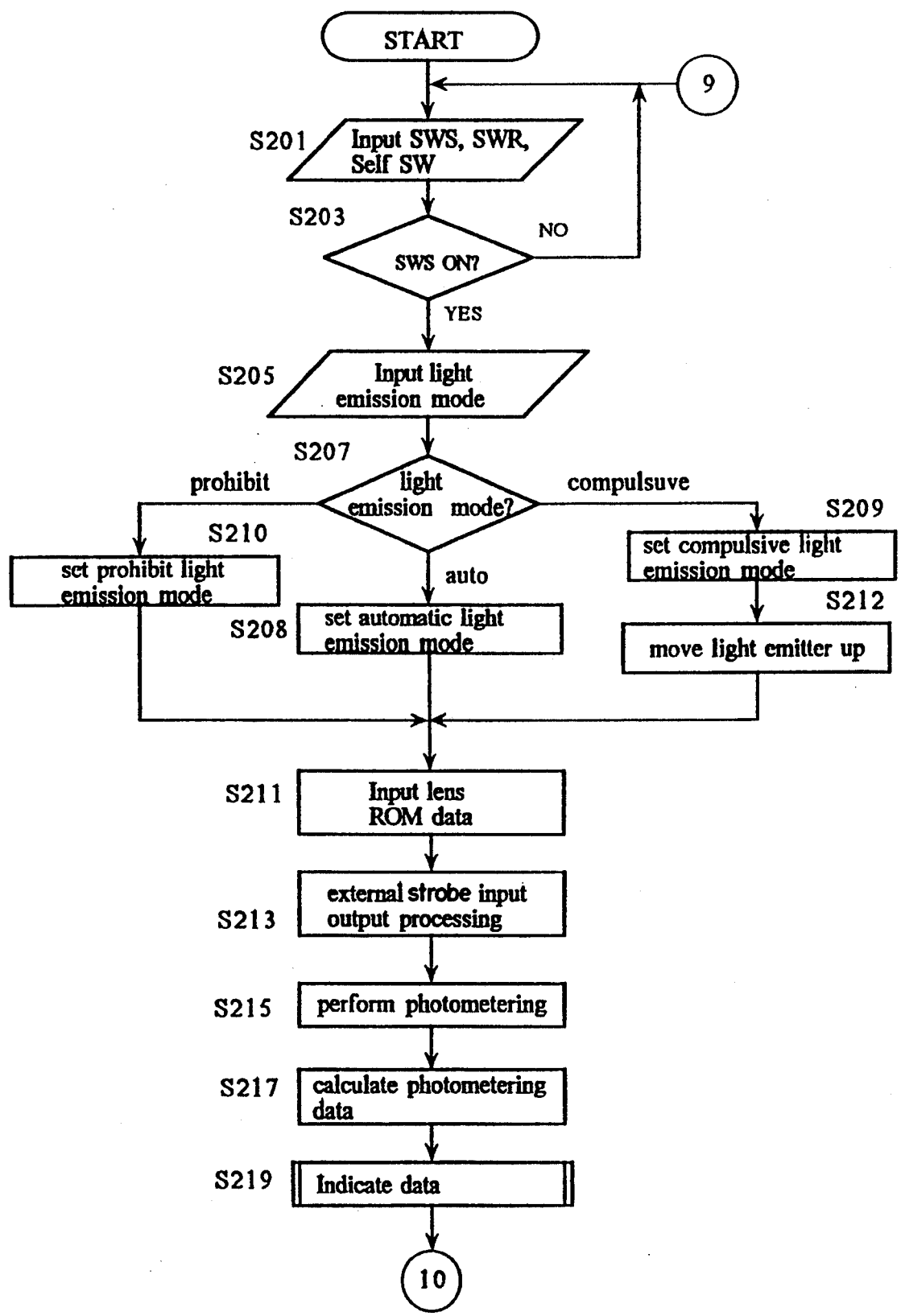
FIGS. 10A and 10B are flow charts of the operations of the single-lens reflex camera according to the third embodiment of the invention, shown in FIGS. 7 through 9.
Figure 10B:
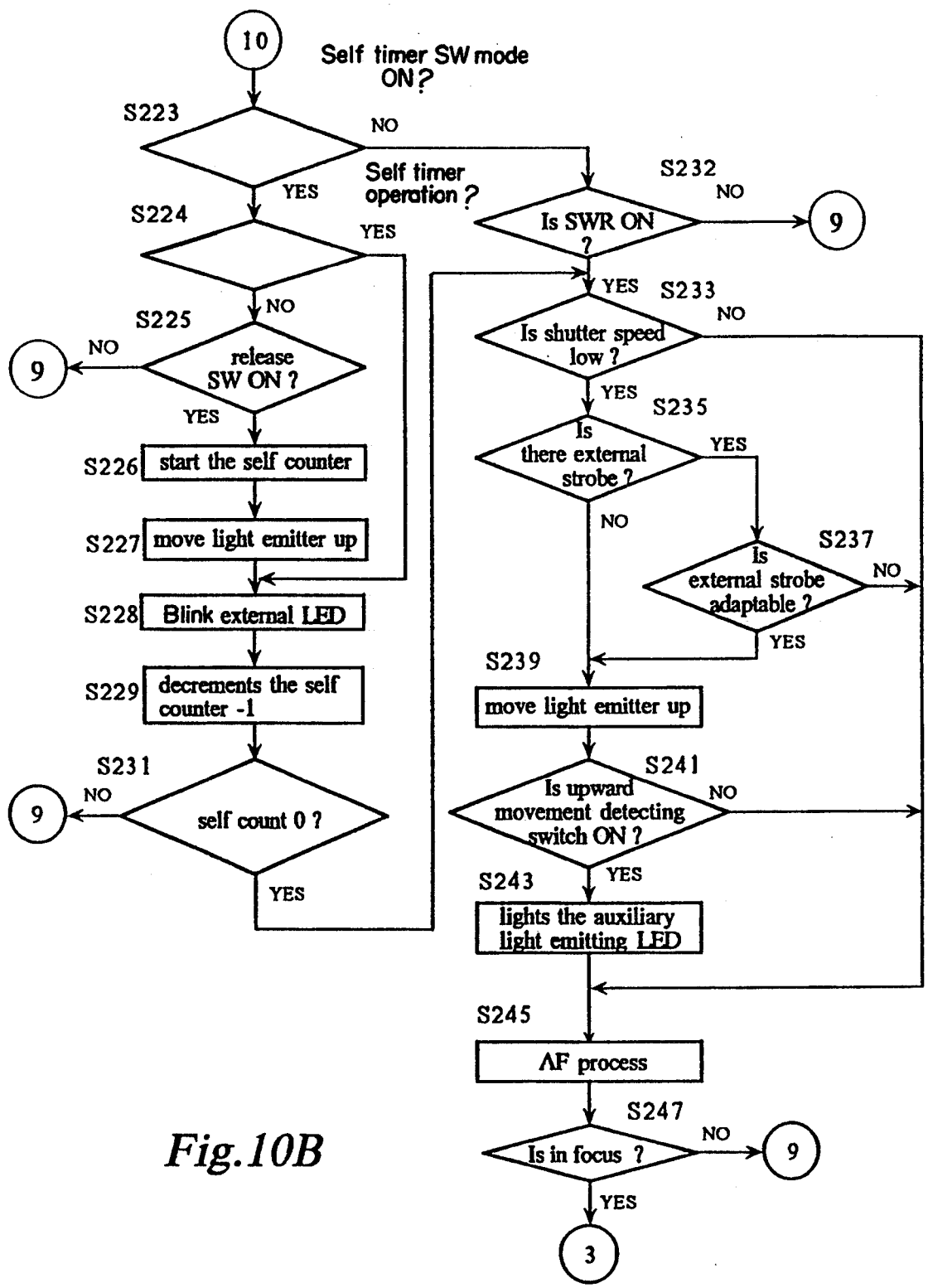
Figure 11:
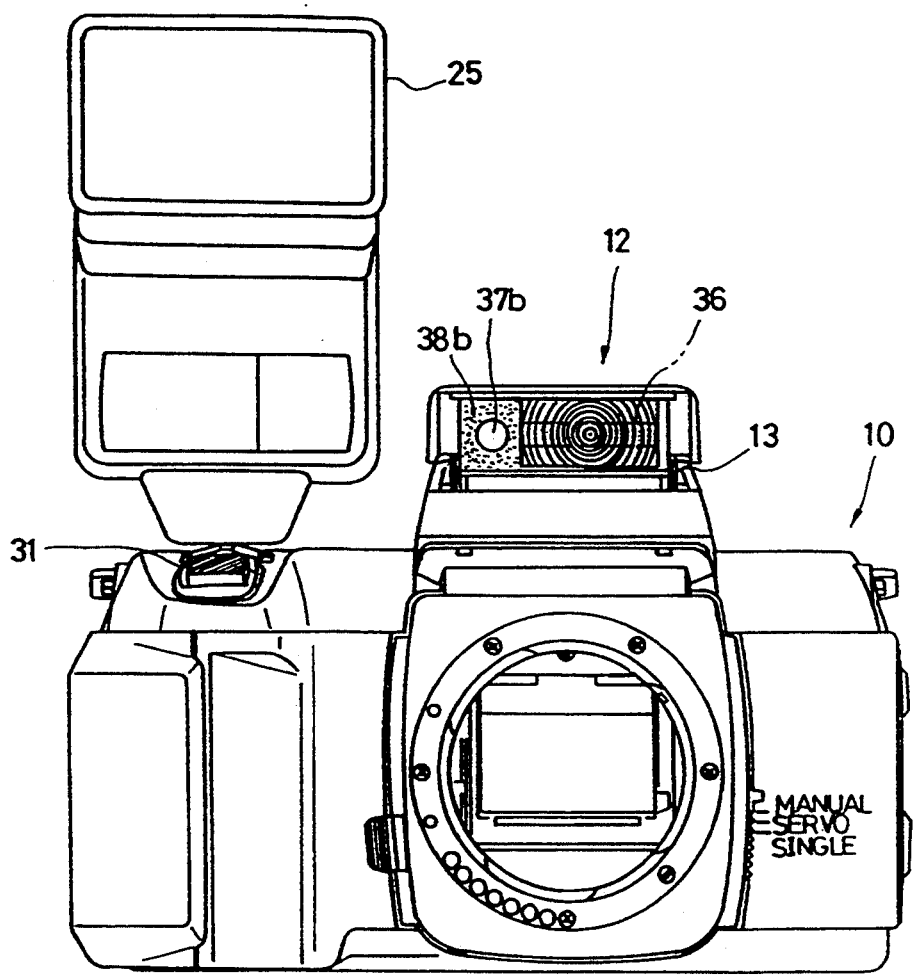
FIG. 11 is a view similar to FIG. 1, showing another embodiment of a self timer indicator.

In FIGS. 10A and 10B, the basic photographic operation is similar to that of the first embodiment, and Accordingly, the same steps as those in FIGS. 4A and 4B are designated with the same reference numerals of the last two digits.

The operations at the normal photographing are the same as those in the first embodiment. In the self timer mode, when the self timer operation starts, the light emitter 12 is moved to the operative position and the self timer indicating LED 38 blinks so that an object can learn the commencement of the self timer operation.

When the set time of the self timer is up, it is determined whether the emission of light should be effected accordance with the exposure factor obtained in the previous photometering process, so that the exposure is performed in accordance with the judgement. Thereafter, the light emitter 12 is moved down to the retracted position.

When predetermined requirements, such as an actuation of the main switch (not shown) are satisfied to commence the program, the switch data of the switches SWS, SWR and SW1 are inputted to the camera control circuit 20 and the control waits for the actuation of the photometering switch SWS (steps S201 and S203).

When the photometering switch SWS is ON, the strobe light emission mode data set by the mode selecting switch SW2 is inputted to the control circuit 20 to set the emission prohibiting mode, the automatic light emission mode, or the compulsive light emission mode (steps S205, S207, S208, S209 and S210) in accordance with the mode data. When the compulsive light emission mode is set, the light emitter 12 is moved to the waiting position (step S211).

The camera control circuit 20 reads the lens information stored in the lens ROM 23 to effect the transmission and reception of information between the camera control circuit and the external strobe 25 through the hot shoe 26 (steps S211 and S213). The camera control circuit 20 calculates the exposure factor, such as a shutter speed, in accordance with the photometering signal output from the photometering circuit 22 and the film sensitivity, etc. (steps S215 and S217).

Thereafter, the camera control circuit 20 causes the LCD panel 29 to indicate the various values set in the camera through the indicating circuit 28 (step S219). The indicated information includes the strobe light emission mode, whether the attached lens is correct or wrong, whether the external strobe is correct or wrong, etc.

Thereafter, it is determined whether the mode is the self timer mode (step S23). If the mode is not the self timer mode, control skips to step S232. If and if the mode is the self timer mode, it is determined whether the operation is the self timer operation (step S224). If the operation is not the self timer operation, it is determined whether the release switch SWR is ON (step S225). If the release switch SWR is ON, the light emitter 12 is moved up to the operative position to start the self timer operation (step S226). The operation at the self timer mode is indicated by the blinkering of the self timer indicating LED 38 (step S228). The subsequent operations are the same as those in the first embodiment.

According to the third embodiment mentioned above, since the upward and downward movements of the light emitter 12, the blinkering of the self timer indicating LED 38 are generically controlled in accordance with the determination whether the strobe should be used, or whether the auxiliary light emitting LED 37 should blink. Preferably, the auxiliary light emitting LED 37 and the self timer indicating LED 38 alternately blink.

Figure 12:
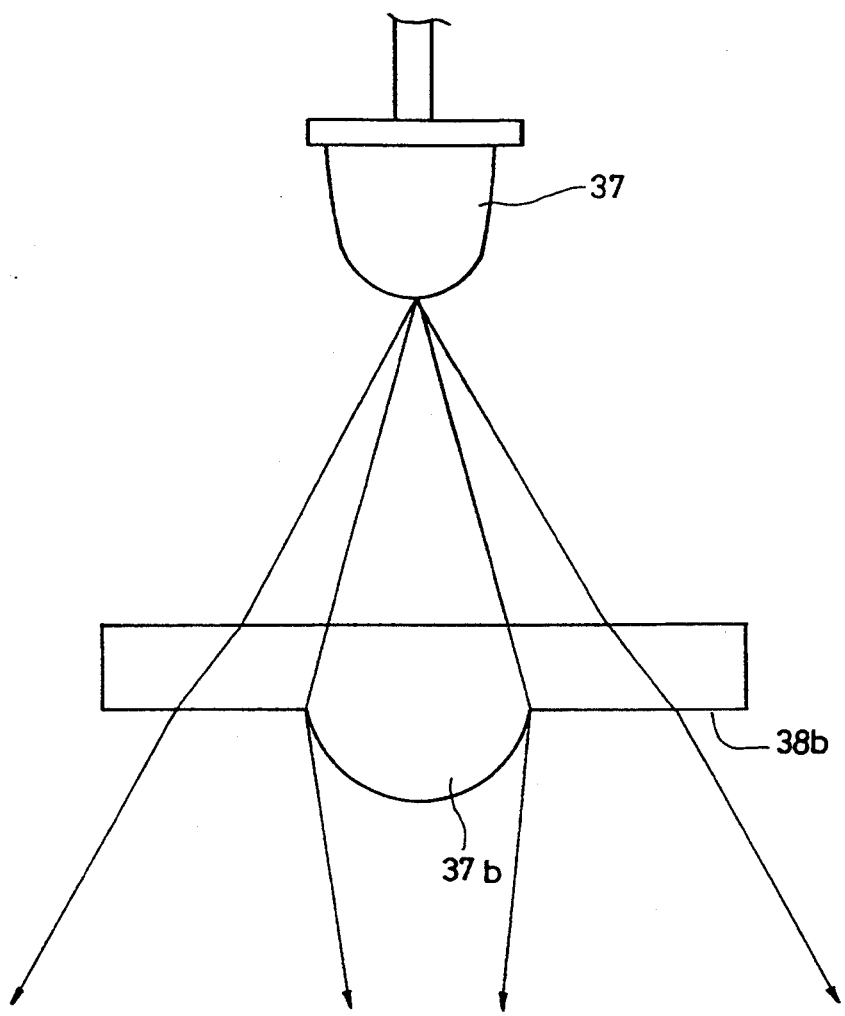
FIG. 12 is a schematic view of a modified embodiment showing an optical system having a condenser lens and a diffusing optical element.
Figure 13:
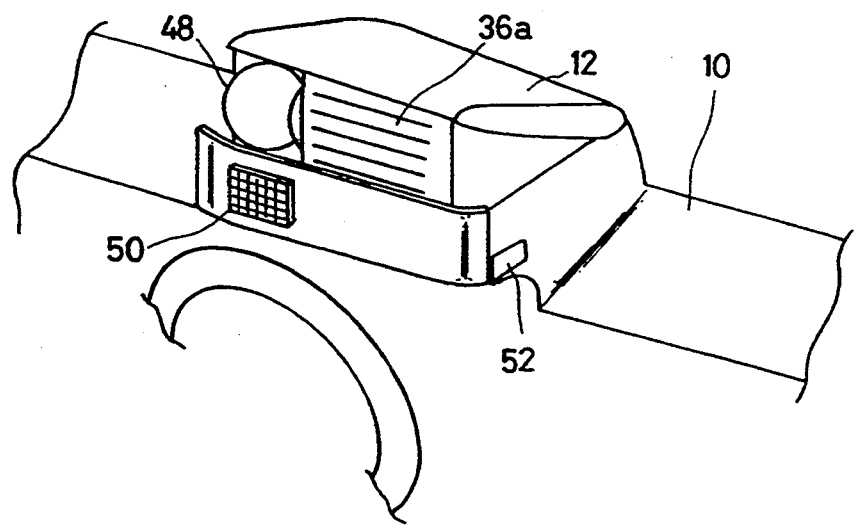
FIG. 13 is a perspective view of a strobe light emitter and the surroundings thereof, according to a fourth embodiment of the present invention.
Figure 14A:
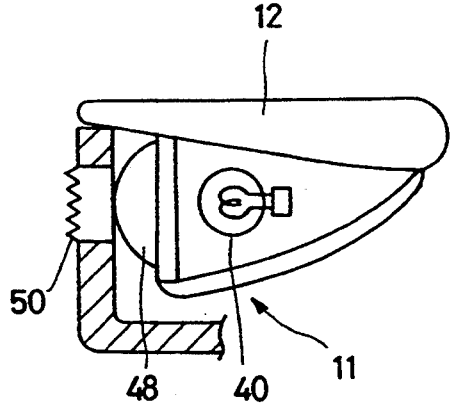
FIGS. 14A and 14B are sectional views of a strobe light emitter shown in a retracted position and an operative position, according to a third embodiment of the invention, respectively.
Figure 14B:
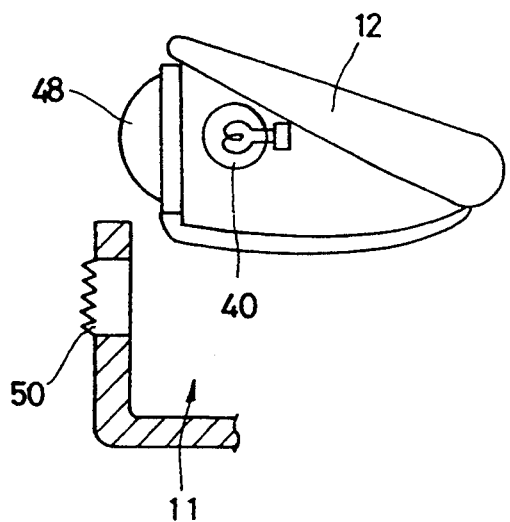
Figure 15:
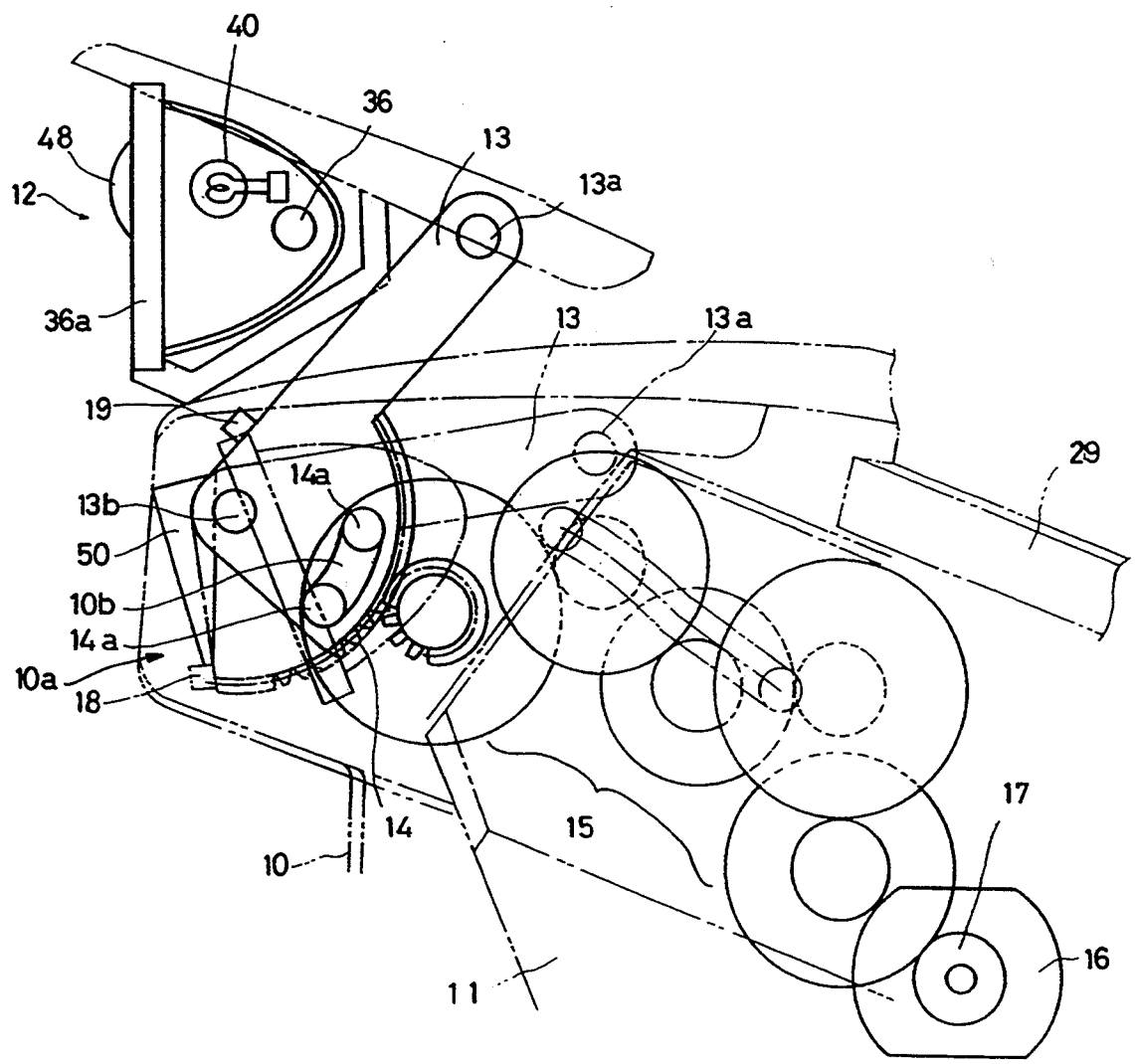
FIG. 15 is a view similar to FIG. 1, according to the fourth embodiment of the present invention; and, FIGS. 16A, 16B, 16C and 16D are flow charts of the operations of a single-lens reflex camera according to a fourth embodiment of the present invention.
Figure 16A:
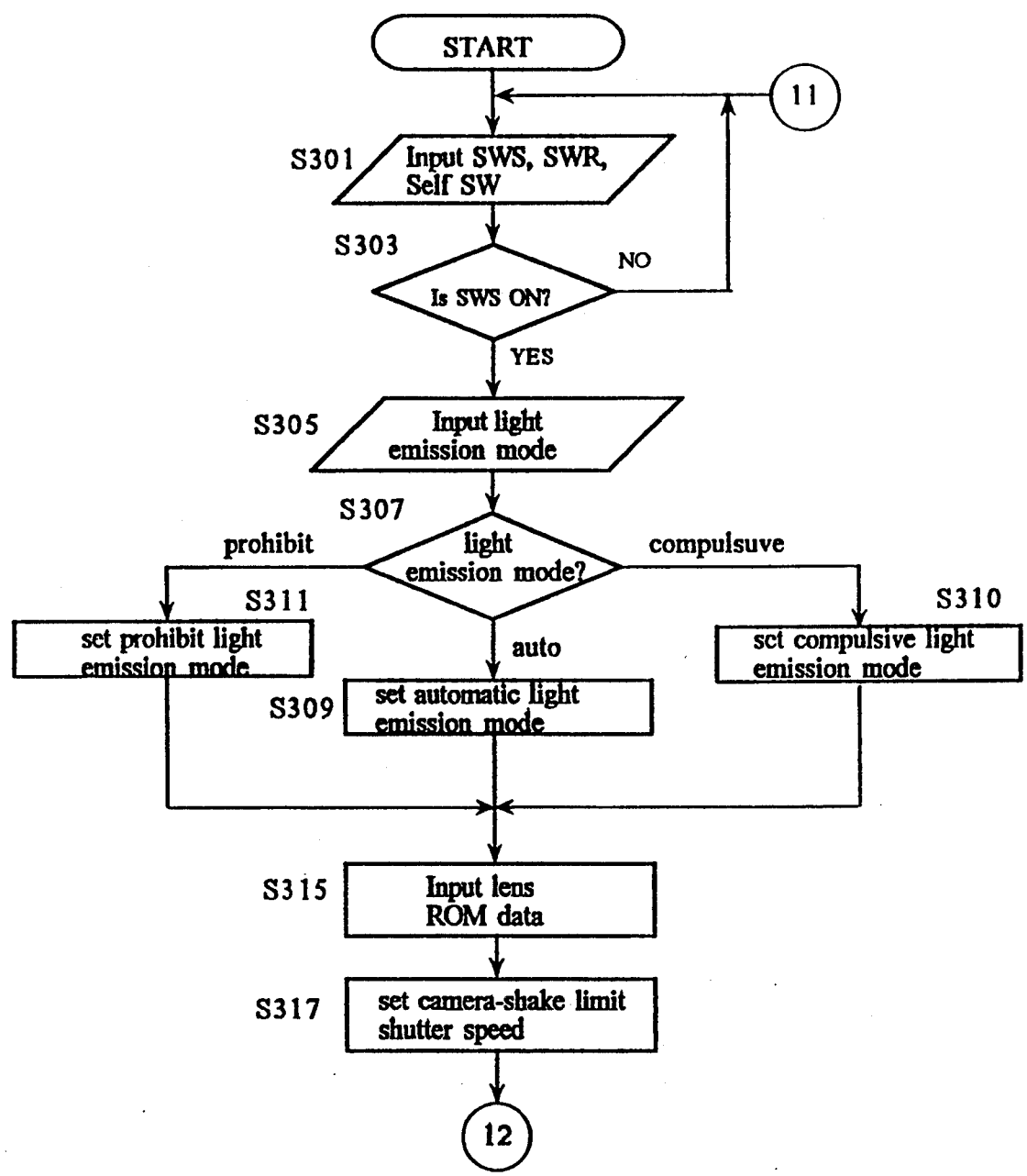
Figure 16B:
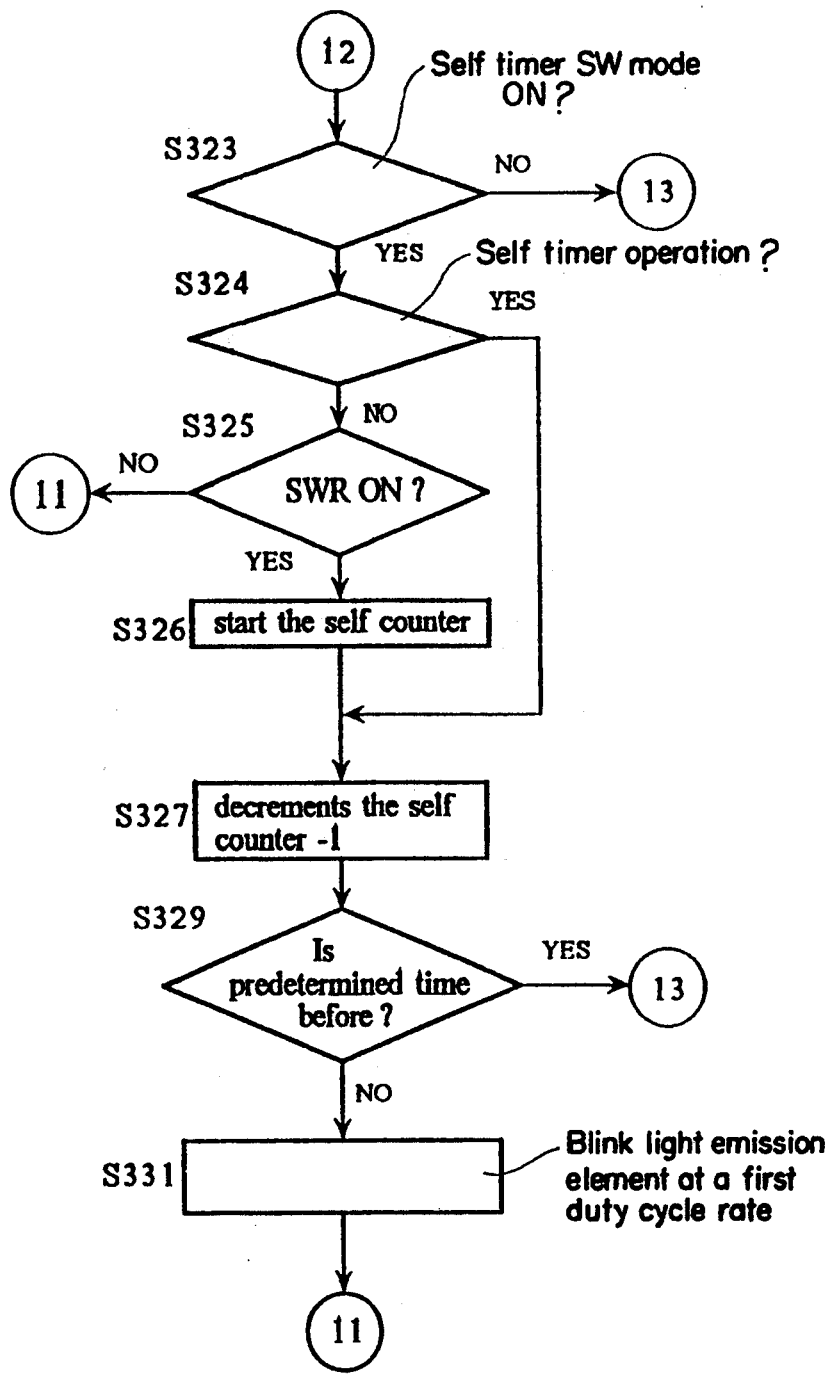
Figure 16C:
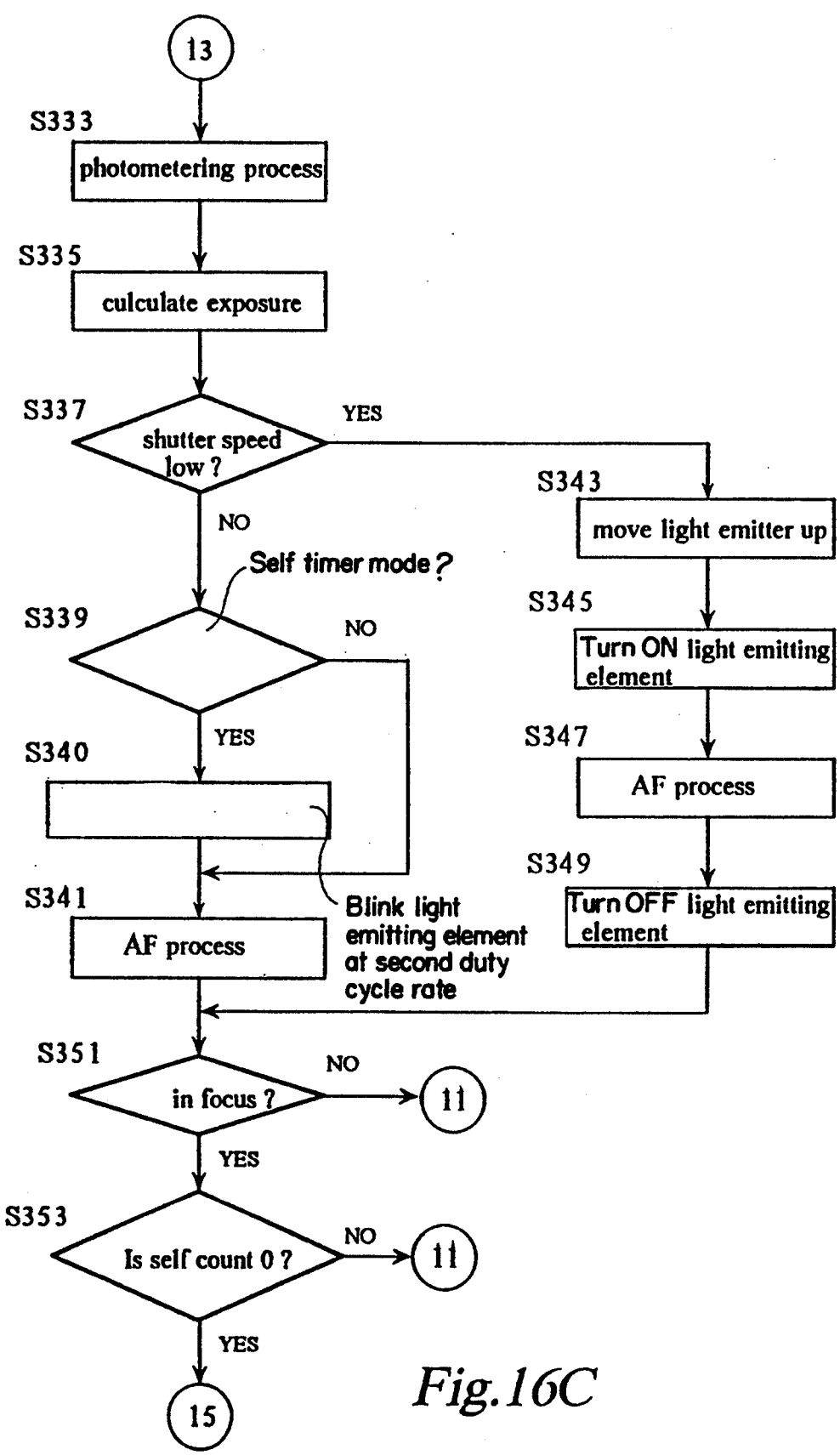
Figure 16D:
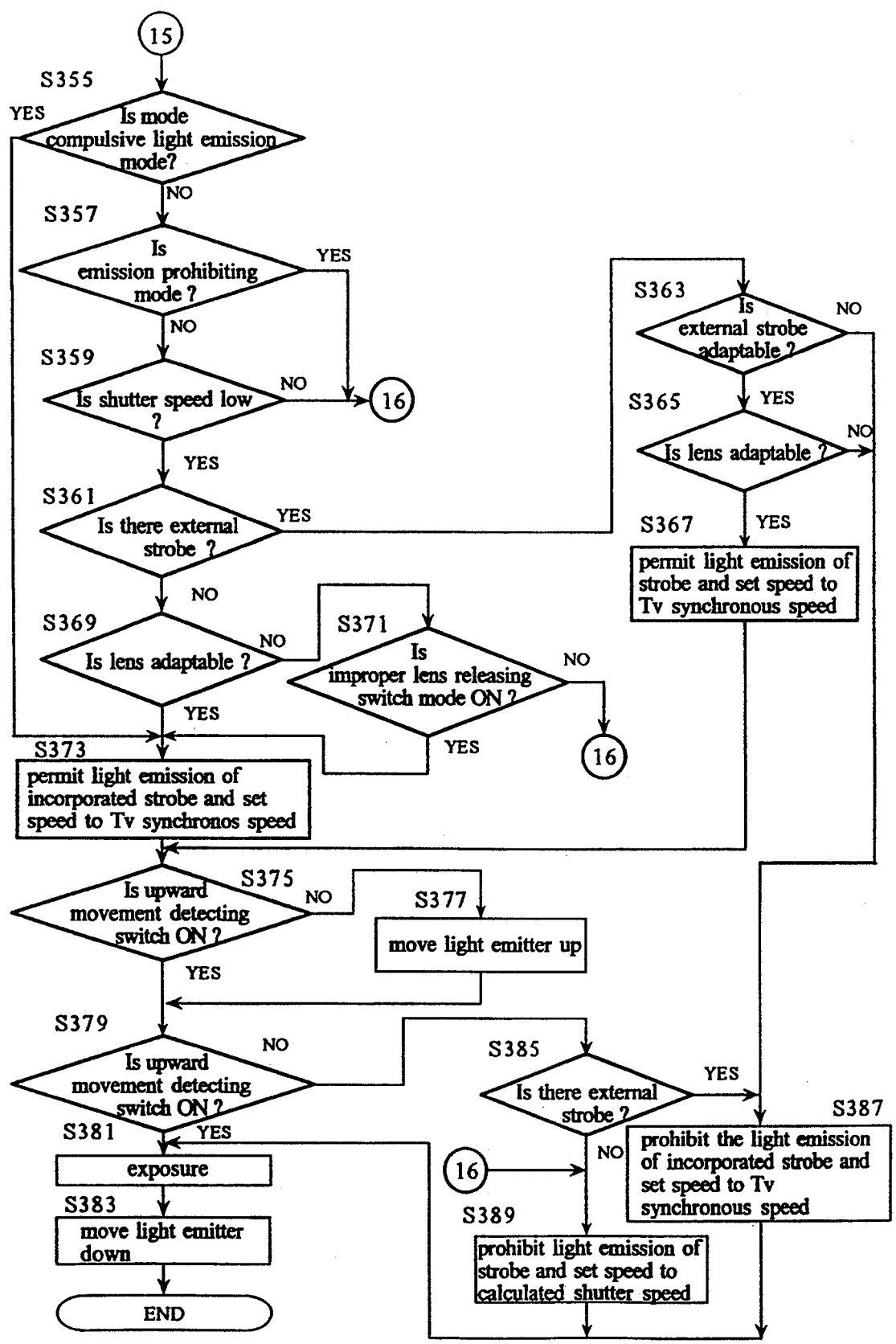

Although the auxiliary light emitting LED 37 and the self timer indicating LED 38 are separately provided in the third embodiment, the two LED's can comprise a single LED. In this case, an optical system which has a center condenser lens 37b and a circumferential diffusion optical system 38b is provided in front of the auxiliary light emitting LED 37, as shown in FIG. 12.

The following discussion will be directed to a fourth embodiment of the present invention, in which the indication of the self timer mode can be observed by an object to be photographed even when the light emitter 12 is in the retracted position, with reference to FIGS. 13 through 16.

The Diffusion lens 50 is provided on the front face of the camera body 10 so as to correspond to the condenser lens 36a of the strobe light emitter 12 which is in the retracted position. The diffusion lens 50 diffuses the contrast pattern which is condensed by the condenser lens 36a. If the light emitting element 16 emits light when the light emitter 12 is in the retracted position, the light is diffused by the diffusion lens 50, so that the diffusion lens 50 is made brighter, as viewed from the object side, at least in the film plane. Preferably, the diffusion lens 50 comprises a transparent or a semi-transparent material, or a material that is colored by a conspicuous color, such as red. Alternatively, the lens can be replaced with a slit or the like.

The operation of the fourth embodiment is as follows: the components corresponding to those in the first, second or third embodiment are designated with the same reference numerals.

The mode selection switch SW2 switches the strobe light emission modes. Every time the mode selection switch SW2 is turned ON, the mode circulatively changes in the order of the automatic light emission mode→the compulsive light emission mode→the emission prohibiting mode→the automatic light emission mode. The "automatic light emission mode" is a mode in which the emission of light of the strobe is controlled in accordance with the object brightness detected by the photometering circuit 22 and the lens data read from the lens ROM 23. The "compulsive light emission mode" is a mode in which strobe light is compulsively emitted regardless of the object brightness. The "emission prohibiting mode" is a mode in which the emission of strobe light is prohibited regardless of the object brightness. The camera control circuit 20 sets the shutter speed upon releasing to be identical to the strobe synchronous speed when the calculated shutter speed is higher than the strobe synchronous speed at the compulsive emission mode.

The light emitting element 40 for emitting the auxiliary strobe light and indicating the self timer operation emits the contrast pattern onto the object to assist the detection of the object distance by the AF unit 27 when the strobe light emitter 12 is in the operative position. In the self timer mode, the light emitting element 40 blinks when the light emitter 12 is in the retracted position, so that an object can learn the commencement and lapse of the self timer operation.

The camera as constructed above operates as follows see (FIGS. 16A through 16D).

In the normal photographing mode, when the photometering switch SWS is turned ON to start the photometering operation, it is determined whether the strobe should be used in accordance with a calculated exposure factor. If it is determined that the strobe should be used, the light emitter 12 is moved up to the operative position to wait for the actuation of the release switch SWR. When the release switch SWR is ON, the strobe light is emitted from the light emitter 12 to perform the exposure at an optimum exposure value. After the exposure is completed, the light emitter 12 is moved down to the retracted position.

In the self timer mode, which is set by the self timer switch SW1, the self timer operation starts when the release switch SWR is made ON. Consequently, the light emitting element 40 blinks to show the commencement of the self timer operation when the light emitter 12 is in the retracted position. When the set time of the self timer is up, the exposure is effected at an optimum exposure value in accordance with the exposure factor obtained in the latest photometering operation immediately before the time is up. When it is determined that the strobe light should be emitted in accordance with the exposure factor obtained in the photometering process immediately before the lapse of the set time of the self timer, or when the mode is the compulsive light emission mode, the light emitter 12 is moved to the operative position to blink the light emitting element 40 to indicate the self timer operation and for emitting the auxiliary strobe light.

The operation will be described in more detail with reference to the flow charts shown in FIGS. 16A through 16D.

After the program starts, the switch data of the switches SWS, SWR and SW1 are input to the camera control circuit 20 to wait for the actuation of the photometering switch SWS (steps S301 and S303).

When the photometering switch SWS is ON, the emission mode data set by the mode selecting switch SW2 is inputted to the camera control circuit 20 (step S305) to select the automatic emission mode, the compulsive emission mode or the emission prohibition mode (steps S307, S309, S310 and S311).

Thereafter, the camera control circuit 20 reads the lens data stored in the lens ROM 23 to calculate and memorize the camera-shake limit shutter speed, based on the focal length data (steps S315 and S317). The lens data stored in the lens ROM 23 includes the kind of the lens, an open diaphragm value, a minimum diaphragm value, etc., in addition to the focal length data.

Thereafter, it is determined whether the mode is the self timer mode (i.e., whether, the self timer switch SW1 is ON) (step S323). If the mode is the self timer mode, control proceeds to step S324, and if the mode is not the self timer mode, the control skips to step S333.

At step S324, it is determined whether or not the operation is during the self timer operation. If the answer is affirmative, control skips to step S327. If the answer is negative, it is determined in step S325 whether the release switch SWR is turned ON. If the answer is affirmative, the self timer counter starts, that is, the self timer operation starts (steps S325 and S326). Thereafter, the decrement of the self timer counter is carried out, so that the control proceeds to step S329.

At step S329, it is determined whether the counted value of the self timer counter is a predetermined time before the set time of the self timer (e.g. two second before the set time of the self timer) is checked. If the answer is negative, the light emitting element 40 blinks at a first duty cycle rate S331. Thereafter, control returns to step S301 to repeat the above-mentioned operations. Conversely, if the answer to step S329 is affirmative, control proceeds to step S333.

At step S333, the photometering circuit 22 operates to perform the photometering operation. At step S335, the arithmetic operation for obtaining the shutter speed and the diaphragm value is carried out in accordance with the photometer signal output from the photometering circuit 22 and the film sensitivity, etc.

Thereafter, it is determined whether the shutter speed thus obtained below a predetermined value (e.g. the camera-shake limit shutter speed obtained at step S317) is (step S337). If the shutter speed is not below the predetermined value, it is determined whether the mode is the self timer mode (steps S339). If the mode is the self timer mode, the light emitting element 40 blinks at a second duty cycle (short cycle) rate that is different from the duty first cycle rate mentioned above to perform the AF process (steps S340 and 341). The blinking of the light emitting element 40 at the second duty cycle rate makes it possible for an object to learn that the release is coming to end. Conversely, if the mode is not the self timer mode, the AF process is carried out without driving the light emitting element 40 (steps S339 and S341).

In the AF process at step S341, the distance of the object is detected by the object distance measuring unit 27. The focusing lens (not shown) of the photographic lens is moved to the focal position by the AF mechanism through a predetermined displacement (amount of defocus) in accordance with the object distance thus detected. Thereafter, control proceeds to step S351.

If the shutter speed is below the predetermined value at step S337, control proceeds to step S343 to drive the strobe motor 16 in order that moves the light emitter 12 up to the operative position. After that, the light emitting element 36 is illuminated at step S345, and then an AF operation similar to the AF operation of step S341 is performed (step S347). Thereafter, the light emitting element 36 is turned OFF at step S349, and control proceeds to step S351. An effect equivalent to the blinking of the light emitting element 40 at the second duty cycle rate at step S340 mentioned above is obtained by the ON/OFF operations of the light emitting element 36 at steps S345 and S349.

At step S351, it is determined whether a desired object to be taken is "in focus". If the object is "out of focus", the control is returned to step S301 to repeat the above-mentioned operations. Conversely, if the object is "in focus", control proceeds to step S353 when the release switch SWR is turned ON at the normal photographing mode, and control proceeds to step S349 when the self timer counter becomes 0 at the self timer mode, respectively. Even if the object is "in focus", if no release switch SWR is ON, or if no self timer counter becomes 0, control proceeds to step S301 to repeat the above-mentioned operations.

The above-mentioned operations, up to step S353, are repeated until the self timer counter becomes 0 and the object is "in focus" in the self timer mode; and Thereafter, the control proceeds to step S355.

At step S355, whether the mode is the compulsive light emission mode. If the mode is the compulsive light emission mode, control skips to step S373. If the mode is not the compulsive light emission mode, control proceeds to step S357.

At step S357, it is determined whether the mode is the emission prohibiting mode. If the mode is the emission prohibiting mode. Control proceeds to step S389, and If the mode is not the emission prohibiting mode. The control proceeds to step S359. The operations subsequent thereto are the same as those in the first embodiment shown in FIG. 4C.

In the fourth embodiment mentioned above, in order to make it possible to observe the blinking of the light emitting element 40 as an auxiliary light emitting member, provided in the light emitter 12, from the side of the object even when the light emitter is in the retracted position, the diffusion optical system 48 is provided on the wall of the camera body 10 so as to be opposed to the light emitting element 40. The light emitting element 40 blinks in at the self timer operation when the light emitter 12 is in the retracted position. Accordingly, the self timer operation can be visibly confirmed without the provision of an additional light emitting element separate from the light emitting element 40, or without projecting the light emitter 12 to the operative position.

The present invention is not limited to the fourth embodiment. For instance, the material of which the diffusion plate 50 is made and the shape thereof are optional. The arrangement of the diffusion plate 50 can be varied in accordance with the condenser lens 36a of the light emitter 12. It is possible to provide a light emitting element for indicating the self timer operation, separate from the light emitting element for emitting the auxiliary light, in the light emitter. The first and second duty cycles rates at which the light emitting element blinks can be optionally selected.

As can be seen from the above discussion, according to the present invention, since the self timer operation indicating member which can be observed from the object side is provided in the strobe light emitter which moves between the retracted position and the operative position, the self timer photographing can be visibly confirmed from the object side by driving the self timer operation indicating member in the self timer operation while keeping the strobe light emitter in the retracted position.

Furthermore, according to the present invention, if the self timer operation indicating member is used also as the auxiliary light emitting member, the number of components can be reduced, resulting in a realization of a compact and simple camera control circuit.

I claim:

1. A strobe control apparatus for a strobe camera having a light emitter that is movable between a retracted position and an operative position, said strobe control apparatus comprising:

a photometering switch;

a photometering circuit, connected to said photometering switch, for determining the brightness of an object to be photographed when said photometering switch is turned ON;

a release operation switch for initiating a release operation of said camera when said switch is turned ON;

a shutter release button comprising means for turning said photometering switch ON when said shutter release button is in a first position and means for turning said release operation switch ON when said shutter release button is in a second position;

means for moving said light emitter between said retracted position and said operative position;

means for executing an automatic light emitting mode, in which said light emitter is moved to said operative position by said moving means and emits light based on the brightness of said object to be photographed, in response to actuation of said shutter button; and means for executing a compulsive light emitting mode, in which said light emitter emits light regardless of the brightness of said object to be photographed, in response to plural consecutive actuations of said photometering switch when said light emitter is located at said operative position.

2. The strobe control apparatus of claim 1, further comprising means for calculating a shutter speed based on said determined brightness of said object when said photometering switch is turned ON.

3. The strobe control apparatus of claim 2, further comprising means for comparing said calculated shutter speed to a predetermined value, said light emitter being moved by said moving means to said operative position and emitting light, by said means for executing an automatic light emitting mode, in accordance with said comparing means determining that said calculated shutter speed is below said predetermined value.

4. The strobe control apparatus of claim 2, further comprising means for comparing said calculated shutter speed to a predetermined value, said light emitter being prohibited from emitting light, by said means for executing an automatic light emitting mode, in accordance with said comparing means determining that said calculated shutter speed is above said predetermined value.

5. The strobe control apparatus of claim 2, further comprising means for comparing said calculated shutter speed with a strobe synchronous speed, said means for executing a compulsive light emitting mode comprising means for setting a shutter speed of said camera to the strobe synchronous speed in accordance with said comparing means determining that said calculated shutter speed is higher than the strobe synchronous speed.

6. The strobe control apparatus of claim 1, further comprising means for detecting that said light emitter is in said operative position, wherein said plural actuations of said photometering switch, when said light emitter is detected by said detecting means as being located at said operative position, comprises a turning OFF of said photometering switch and then a turning ON of said photometering switch.

7. The strobe control apparatus of claim 1, further comprising means for detecting that said light emitter is in said operative position, wherein said compulsive light emitting mode is executed, by said means for executing said compulsive light emitting mode, when said light emitter is manually moved from said retracted position and detected by said detecting means as being moved to said operative position.

8. The strobe control apparatus of claim 1, further comprising means for detecting that said light emitter is in said operative position, and means for determining the light emitting mode of said light emitter, wherein said compulsive light emitting mode is executed, by said means for executing said compulsive light emitting mode, in accordance with said determining means determining that said light emitter is in said automatic light emitting mode and said detecting means detecting that said light emitter is located at said operative position, and in response to said photometering switch being turned OFF and then subsequently turned ON.

9. A strobe control apparatus for a strobe camera having a light emitter that is movable between a retracted position and an operative position, said strobe control apparatus comprising:
 a photometering switch;
 a photometering circuit, connected to said photometering switch, for determining the brightness of an object to be photographed when said photometering switch is turned ON;
 means for counting a number of actuations of said photometering switch;
 means for moving said light emitter between said retracted position and said operative position;
 means for detecting that said light emitter is in said operative position;
 means for performing an automatic light emitting mode in which said light emitter is moved by said moving means to said operative position and emits light based on the brightness of said object to be photographed;
 means for performing a compulsive light emitting mode in which said light emitter emits light regardless of the brightness of said object to be photographed; and
 means for changing a light emitting mode of said light emitter between said automatic light emitting mode and said compulsive light emitting mode in accordance with the number of actuations of said photometering switch counted by said counting means, such that when said light emitter is detected by said detecting means as being in said operative position and plural actuations of said photometering switch are counted by said counting means, including a turning OFF of said photometering switch and then subsequently a turning ON of said photometering switch, the light emitting mode of said light emitter is changed to said compulsive light emitting mode by said changing means.

10. The strobe control apparatus of claim 9, further comprising means for calculating a shutter speed based on said determined brightness of said object when said photometering switch is turned ON.

11. The strobe control apparatus of claim 10, further comprising means for comparing said calculated shutter speed to a predetermined value, said light emitter being moved by said moving means to said operative position and emitting light, by said means for executing an automatic light emitting mode, in accordance with said comparing means determining that said calculated shutter speed is below said predetermined value.

12. The strobe control apparatus of claim 10, further comprising means for comparing said calculated shutter speed to a predetermined value, said light emitter being prohibited from emitting light, by said means for executing an automatic light emitting mode, in accordance with said comparing means determining that said calculated shutter speed is above said predetermined value.

13. The strobe control apparatus of claim 10, further comprising means for comparing said calculated shutter speed with a strobe synchronous speed, said means for executing a compulsive light emitting mode comprising means for setting a shutter speed of said camera to the strobe synchronous speed in accordance with said comparing means determining that said calculated shutter speed is higher than the strobe synchronous speed.

14. The strobe control apparatus of claim 9, wherein said compulsive light emitting mode is executed, by said means for performing said compulsive light emitting mode, when said light emitter is manually moved from said retracted position and detected by said detecting means as being moved to said operative position.

* * * * *